(12) United States Patent
Linnen et al.

(10) Patent No.: US 11,893,244 B2
(45) Date of Patent: Feb. 6, 2024

(54) HYBRID MEMORY MANAGEMENT OF NON-VOLATILE MEMORY (NVM) DEVICES FOR USE WITH RECURRENT NEURAL NETWORKS

(71) Applicant: Western Digital Technologies, Inc., San Jose, CA (US)

(72) Inventors: Daniel Joseph Linnen, Naperville, IL (US); Ariel Navon, Revava (IL); Alexander Bazarsky, Holon (IL); Ofir Pele, Hod Hasharon (IL)

(73) Assignee: Western Digital Technologies, Inc., San Jose, CA (US)

( * ) Notice: Subject to any disclaimer, the term of this patent is extended or adjusted under 35 U.S.C. 154(b) by 206 days.

(21) Appl. No.: 17/499,588

(22) Filed: Oct. 12, 2021

(65) Prior Publication Data

US 2023/0116755 A1 Apr. 13, 2023

(51) Int. Cl.
*G06F 3/06* (2006.01)
*G06F 11/10* (2006.01)
*G06N 3/10* (2006.01)

(52) U.S. Cl.
CPC .......... *G06F 3/0619* (2013.01); *G06F 3/0658* (2013.01); *G06F 3/0685* (2013.01); *G06F 11/1012* (2013.01); *G06N 3/10* (2013.01)

(58) Field of Classification Search
CPC .... G06F 3/0619; G06F 3/0658; G06F 3/0685; G06F 3/061; G06F 3/0688; G06F 3/065; G06F 11/1012; G06N 3/10
See application file for complete search history.

(56) References Cited

U.S. PATENT DOCUMENTS

| 10,222,990 B2 | 3/2019 | Bazarsky et al. |
| 2014/0136915 A1* | 5/2014 | Hyde ............ G06F 11/0703 714/747 |
| 2014/0237162 A1 | 8/2014 | Brewer et al. |
| 2020/0159445 A1 | 5/2020 | Kachare et al. |

(Continued)

FOREIGN PATENT DOCUMENTS

| WO | 2020256787 A1 | 12/2020 |
| WO | 2021112920 A1 | 6/2021 |

OTHER PUBLICATIONS

International Search Report and Written Opinion for International Application No. PCT/US22/30620 dated Sep. 19, 2022, 8 pages.

(Continued)

*Primary Examiner* — Hiep T Nguyen
(74) *Attorney, Agent, or Firm* — LOZA & LOZA, LLP; Gabriel Fitch

(57) ABSTRACT

Recurrent Neural Networks (RNNs) wherein a non-volatile memory (NVM) array provides a memory bank for the RNN. The RNN may include a Neural Turning Machine (NTM) and the memory bank may be an NTM matrix stored in the NVM array. In some examples, a data storage device (DSD) that controls the NVM array includes both a data storage controller and a separate NTM controller. The separate NTM controller accesses the NTM matrix of the NVM array directly while bypassing flash translation layer (FTL) components of the data storage controller. Additionally, various majority wins error detection and correction procedures are described, as well as various disparity count-based procedures.

24 Claims, 18 Drawing Sheets

(56) References Cited

U.S. PATENT DOCUMENTS

| | | | |
|---|---|---|---|
| 2020/0174748 A1* | 6/2020 | Roberts | G06F 7/22 |
| 2020/0211640 A1 | 7/2020 | Sharon et al. | |
| 2020/0233743 A1* | 7/2020 | Lien | G11B 20/0021 |
| 2021/0133125 A1 | 5/2021 | Ryu | |
| 2021/0271611 A1 | 9/2021 | Therene et al. | |
| 2022/0246252 A1* | 8/2022 | Stache | G16C 60/00 |
| 2022/0300184 A1* | 9/2022 | Yang | G06F 3/0652 |

OTHER PUBLICATIONS

Wei, Rongshan et al., "Memory Access Optimization of a Neural Network Accelerator Based on Memory Controller", Electronics 2021; 10(4); 438; Feb. 10, 2021; https://doi.org/10.3390/electronics10040438; 20 pages.

Muthirayan, Deepan et al., "Memory Augmented Neural Network Adaptive Controllers: Performance and Stability", Cornell University; Computer Science: Systems and Control; Oct. 7, 2021; https://arxiv.org/abs/1905.02832; 14 pages.

International Search Report and Written Opinion for International Application No. PCT/US22/30621 dated Sep. 13, 2022, 8 pages.

Graves, Alex et al., "Hybrid computing using a neural network with dynamic external memory"; Nature; vol. 538; Oct. 27, 2016; https://doi.org/10.1038/nature20101; 21 pages.

Collier, Mark et al., "Memory-Augmented Neural Networks for Machine Translation"; Cornell University; Sep. 18, 2019; https://arxiv.org/abs/1909.08314; 10 pages.

Graves, Alex et al., "Neural Turing Machines"; Cornell University; Dec. 10, 2014; https://arxiv.org/abs/1410.5401; 26 pages.

* cited by examiner

HYBRID MEMORY MANAGEMENT OF NON-VOLATILE MEMORY (NVM) DEVICES FOR USE WITH RECURRENT NEURAL NETWORKS

FIELD

The disclosure relates, in some aspects, to data storage devices having non-volatile memory (NVM) arrays. More specifically, but not exclusively, aspects relate to systems and methods for managing the NVM arrays for use with recurrent neural networks.

INTRODUCTION

Recurrent neural networks (RNNs) are artificial neural networks configured so that connections between nodes form a directed graph along a temporal sequence to allow the network to exhibit temporal dynamic behavior. Neural Turing Machines (NTMs), or more generally Memory Augmented Neural Networks (MANNs), are types of recurrent neural networks. An NTM has a neural network controller coupled to external memory resources with which the controller interacts using attentional mechanisms (e.g. mechanisms that focus the attention of the network on particular portions of data stored in the external memory). NTMs have the potential to accelerate the manner by which RNNs process information. There is an on-going need to provide improvements within NTMs, MANNs, and other RNNs, and with devices that are configured to implement NTMs, MANNs, and other RNNs.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes: a non-volatile memory (NVM) array; and a controller coupled to the NVM array and having a processor configured to: store at least three copies of neural network data of a neural network in the NVM array, wherein the neural network data comprises weights; read the at least three copies of the neural network data from the NVM array; and perform a majority rules error correction procedure on the at least three copies of the neural network data read from the NVM array.

Another embodiment of the disclosure provides a method for use by a data storage device that includes an NVM array. The method includes: storing at least three copies of neural network data of a neural network in the NVM array, wherein the neural network data comprises weights; reading the at least three copies of the neural network data from the NVM array; and performing a majority rules error correction procedure on the at least three copies of the neural network data read from the NVM array.

Another embodiment of the disclosure provides a data storage device that includes an NVM array and a controller that is coupled to the NVM array. The controller has having a processor that is configured to: store scrambled neural network data in the NVM array; read the scrambled neural network data from the NVM array; maintain a running total of a disparity in a count of binary ones and a count of binary zeroes in the scrambled neural network data; descramble the neural network data read from the NVM array, in response to a determination that the running total does not exceed a disparity threshold; and generate an indication of an error in the neural network data, in response to a determination that the running total exceeds the disparity threshold.

Yet another embodiment of the disclosure provides a method for use with a data storage device that includes an NVM array. The method includes: storing scrambled neural network data in the NVM array; reading the scrambled neural network data from the NVM array; maintaining a running total of a disparity in a count of binary ones and a count of binary zeroes in the scrambled neural network data; descrambling the neural network data read from the NVM array, in response to a determination that the running total does not exceed a disparity threshold; and generating an indication of an error in the neural network data, in response to a determination that the running total exceeds the disparity threshold.

DETAILED DESCRIPTION

Figure 1:
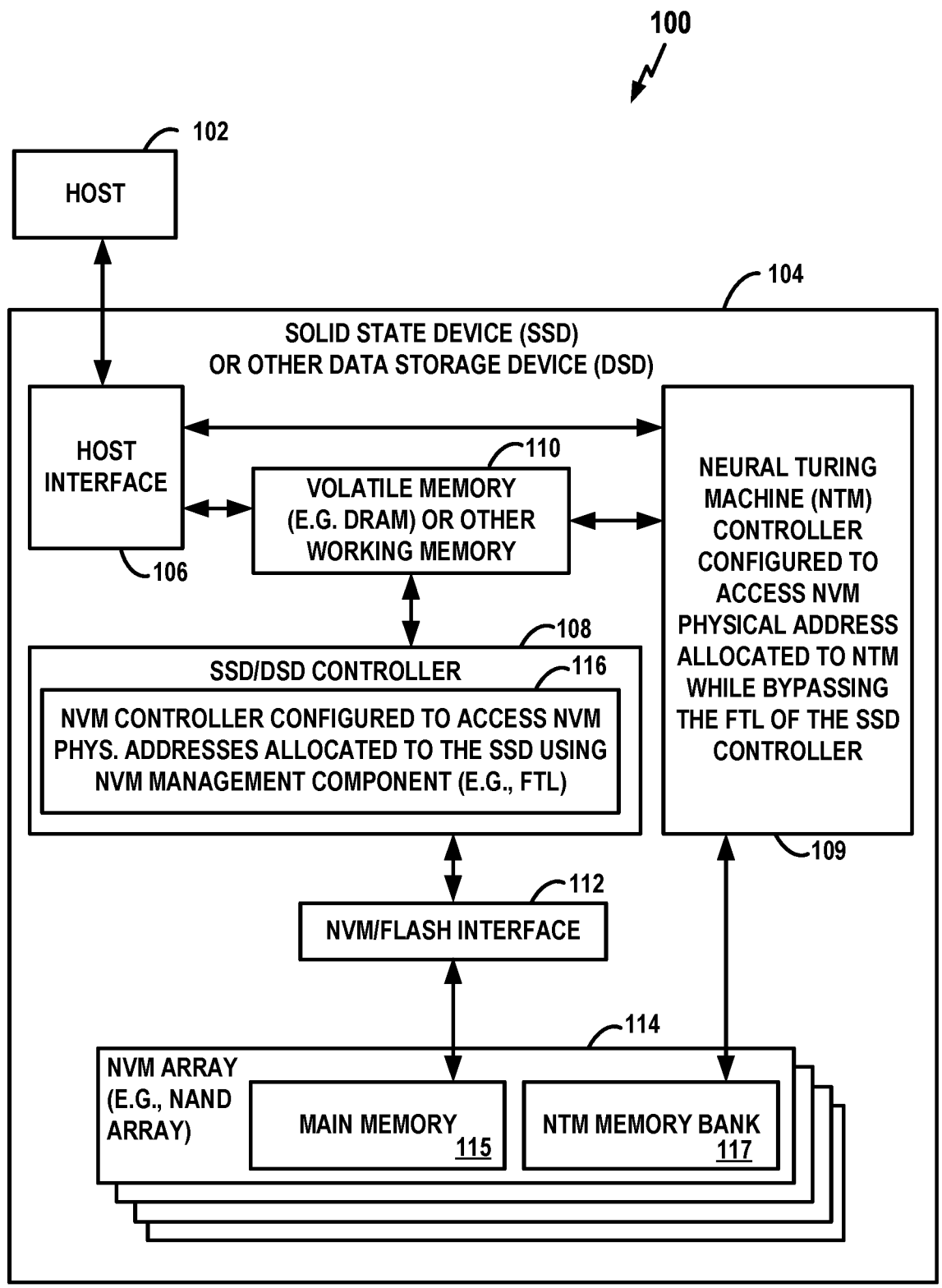
FIG. 1 is a schematic block diagram of a data storage device in the form of an exemplary solid state device (SSD), or other data storage device (DSD), having a non-volatile memory (NVM) array, where the NVM array stores a Neural Turning Machine (NTM) memory bank accessible directly by an NTM controller that is separate from an SSD controller.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (DSD), such as a solid state device (SSD), and in particular to solid-state memory storage devices such as those that use NAND flash memory (herein "NANDs"). (A NAND is a type of non-volatile storage technology that does not require power to retain data. It exploits negative-AND, i.e. NAND, logic.) For the sake of brevity, an SSD having one or more NAND dies will be used as a non-limiting example of a DSD below in the description of various embodiments. It is understood that at least some aspects described herein may be applicable to other forms of data storage devices as well. For example, at least some aspects described herein may be applicable to a data storage or memory device including phase-change memory (PCM) arrays, magneto-resistive random access memory (MRAM) arrays, storage class memory, and resistive random access memory (ReRAM) arrays. In addition, the various embodiments may be used in various machine learning devices which may include some combination of processing elements and memory/data storage elements, including the NVM arrays constructed/configured in accordance with the described embodiments.

Overview

As noted above, recurrent neural networks (RNNs) are configured allow the network to exhibit temporal dynamic behavior. A Neural Turing Machine (NTM) is a type of RNN having a neural network controller coupled to external memory resources, wherein the controller exploits mechanisms that focus the attention of the network on particular portions of data stored in the external memory. An NTM with a long short-term memory (LSTM) network controller can infer algorithms such as copying, sorting, and associative recall from examples alone. NTMs are changing and accelerating the way RNNs processes information. NTMs have two major components: a neural network controller and a memory bank. The controller executes neural network operations on the memory bank to form substantially any type of neural network, including those with feed-forward components. The memory bank stores processed information within, e.g., a matrix of size N×D, having N vector rows where each row has D columns or dimensions. In one update iteration, the controller processes input and interacts with the memory bank to generate output. The interaction is handled by a set of parallel read and write "heads," which are computational components of the NTM architecture. An NTM read head outputs a weighted combination of memory locations, which may be referred to as a read vector, and which is fed back to the controller at the following time-step. An NTM write head modifies the memory "softly" (e.g. depending on its weights) with an erase and an add vector, both generated by the controller.

The memory part of a typical NTM architecture is a simple buffer that generally does not have computation capabilities. The memory may be, for example, random access memory (RAM). Every component of the NTM architecture is differentiable, making the network straightforward to train with gradient descent and back propagation. This may be achieved by defining "blurry" read and write operations that interact to a greater or lesser degree with all the elements in memory (rather than addressing a single element). The degree of blurriness is determined by an attentional focus mechanism that constrains each read and write operation to interact with a small portion of the memory, while ignoring the rest. That is, small or sparse portions of the memory are attentionally-selected. Because interaction with the memory is sparse, the NTM is biased toward storing data without interference. The memory location brought into attentional focus is determined by specialized output values emitted by the aforementioned heads. These outputs define a normalized weighting over the rows of the memory matrix (referred to as memory "locations"). Each weighting—one per read or write head—sets the degree to which the head reads or writes at each location. A head can thereby attend strongly to the memory at a single location or weakly to the memory at many locations.

Insofar as reading is concerned, let $M_t$ be the contents of the N×D memory matrix at time t, where N is the number of memory locations, and D is the vector size or dimension at each location. Let $w_t$ be a vector of weightings over the N locations emitted by a read head at time t. Since all weightings are normalized, the N elements $w_t(i)$ of $w_t$ obey the following constraints:

$$\sum_i w_t(i) = 1, 0 \le w_t(i) \le 1, \forall i. \tag{1}$$

The read vector $r_t$ is defined as a linear combination of the row-vectors $M_t(i)$ in memory:

$$r_t \leftarrow \sum_i w_t(i) M_t(i), \tag{2}$$

which is differentiable with respect to both the memory and the weighting.

Insofar as NTM writing is concerned, writes are divided into two parts, an erasure operation followed by an addition operation. Given a weighting $w_t$ emitted by a write head at time t, along with an erase vector $e_t$ whose M elements all lie in the range (0, 1), the memory vectors $M_{t-1}(i)$ from the previous time-step may be modified as follows:

$$\tilde{M}_t(i) \leftarrow M_{t-1}(i)[1-w_t(i)e_t], \tag{3}$$

where 1 is a row-vector of all 1's, and the multiplication against the memory location acts point-wise. Therefore, the elements of a memory location are reset to zero only if both the weighting at the location and the erase element are one. If either the weighting or the erase is zero, the memory is left unchanged (that is, erasure here means setting to zero). When multiple write heads are present, the erasures can be performed in any order, as multiplication is commutative. Each write head also produces a length D and vector $\alpha_t$, which is added to the memory after the erase step has been performed:

$$M_t(i) \leftarrow \tilde{M}_t(i) + w_t(i)a_t. \quad (4)$$

Note again that the order in which the additions are performed by multiple heads is irrelevant. The combined erase and add operations of all the write heads produces the final content of the memory at time t. Since both erase and add are differentiable, the composite write operation is differentiable as well. Note also that both the erase and add vectors have D independent components, allowing fine-grained control over which elements in each memory location are modified.

Typically, an NTM uses a RAM as its external memory resource. The NTM matrix is maintained within the RAM and all computations are performed within the NTM controller based on data read from and written to the RAM. That is, the aforementioned read and write heads are components of the controller that operate on data stored in the RAM. The NTM controller may be configured to control the RNN based on the inputs to and outputs from the RAM so as to optimize RNN algorithmic performance based on labels supplied externally in a training phase. The RAM merely stores data and performs no NTM computations.

Herein, NTM configurations and architectures are described that instead use a non-volatile memory (NVM) array to store the NTM memory matrix or other RNN memory banks or related data and information.

NVM arrays are often incorporated within flash drives (or NAND drive) that include a data storage controller that writes/reads data to/from the NVM array. Although one might use a data storage controller of a flash drive to access NTM memory bank data stored on a NAND NVM array of the flash drive (so that, for example, a host might serve as the NTM controller), issues can arise due to the flash management operations of the flash drive. In this regard, the inherent nature of NAND flash technology usually requires sophisticated and complicated flash management techniques to make the NAND NVM array a practical storage medium for computing systems, and the flash management techniques may hinder the speed and efficiency of the NTM processing.

Many of these flash management techniques are implemented by a flash translation layer (FTL) within the data storage controller of a flash drive (i.e., an SSD). (An FTL is a type of NVM management component or flash management component that is configured mostly in firmware and manages access to the NAND NVM array by performing logical-to-physical address translation, as well as other functions such as garbage collection, wear-leveling, error correction code (ECC), and bad block management.) However, for open-channel SSDs, the management of the physical solid-state storage is controlled by the host computer's operating system. (An open-channel solid state drive is a solid-state drive that does not have an FTL implemented in the drive. The Linux 4.4 kernel is an example of an operating system kernel that supports open-channel SSDs.)

Flash management issues for NAND NVMs that may be addressed or managed (at least in part) by an FTL or by the host for open-channel SSDs include: 1) wear-out mechanisms that limit service life; 2) the need to erase before programming (writing); 3) data errors caused by write and read disturb; 4) data retention errors; and 5) management of initial and grown bad blocks. Significant factors influencing the reliability, performance, and write endurance of a NAND NVM include: the use of single level cell (SLC) vs. multi-level cell (MLC) NAND flash technology; wear-leveling algorithms; ensuring data integrity through bad block management techniques; the use of error detection and correction techniques; and write amplification.

With proper FTL and other flash management techniques, these characteristics of NAND flash drives can be managed to provide a reliable data storage device. However, the operations of the FTL and other flash management components of a NAND data storage controller (or by the host operating system for open-channel SSDs) are not necessarily well-suited to the read head and write head operations for NTM or other forms of RNN. For example, the unique aspects of an NTM (as described briefly above) might suffer from the overhead of an external flash management supervisor (e.g., FTL) but still may not justify the strict use-case limitation of full-host management of the flash (via open-channel systems).

Herein, systems and methods are described wherein an NTM manages its own NAND memory to avoid the need for full flash-management overhead (e.g., an FTL, etc.) using the SSD flash drive while also avoiding the need for a full host-based memory management system (as in with an open-channel SSD where the host performs the flash management). This management by the NTM of its own NAND memory may be called self-NTM-NAND management. For example, NTM configurations and architectures are described herein that provide an NTM controller that is separate from an SSD data storage controller (and also separate from the host), with the SSD data storage controller and the separate NTM controller configured to access separate portions or partitions of the NVM array using separate sets of physical addresses. In this manner, the NTM controller bypasses the FTL of the data storage controller. Although described primarily with reference to NTM examples, aspects herein are also applicable to other forms of RNNs.

Other aspects described herein relate to error correction techniques that may be applied to NTM data in an NTM memory bank of an NVM or to other types of neural network data stored in an NVM array. In one aspect, a majority rules error correction procedure is provided wherein a controller coupled to the NVM array: 1) stores at least three copies of neural network data of a neural network in the NVM array; 2) reads the at least three copies of the neural network data from the NVM array; 3) and performs a majority rules error correction procedure on the at least three copies of the neural network data read from the NVM array. Other aspects relate to scrambling and de-scrambling data. For example, a disparity count-based procedure is described for use with scrambled data wherein a controller coupled to an NVM: 1) stores scrambled versions of neural network data in the NVM array; 2) reads the scrambled versions of the neural network data from the NVM array; 3) maintains a running total of a disparity in a count (or number) of binary ones and a count (or number) of binary zeroes in the scrambled versions of the data; 4) descrambles the neural network data read from the NVM array, in response to a determination that the running total does not exceed the disparity threshold; and 5) re-writes or re-stores the neural network data stored in the NVM array, in response to a determination that the running total exceeds the disparity threshold.

These and other features will be described below.

Exemplary Data Storage Device with NVM-Based NTM Memory Matrix/Bank

FIG. 1 is a block diagram of a system 100 including an exemplary SSD (or DSD) having an NVM with an NTM memory matrix or other RNN memory bank. The system 100 includes a host 102 and an SSD 104 or other DSD coupled to the host 102. The host 102 provides commands to the SSD 104 for transferring data between the host 102 and the SSD 104. For example, the host 102 may provide a write command to the SSD 104 for writing data to the SSD 104 or a read command to the SSD 104 for reading data from the SSD 104. The host 102 may also provide labels for training the NTM. The host 102 may be any system or device with a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples. Additionally or alternatively, the host 102 may be a system or device having a need for neural network processing, such as speech recognition, computer vision, and self-driving vehicles. For example, the host 102 may be a component of a self-driving system of a vehicle.

The SSD 104 includes a host interface 106, an SSD/DSD controller 108, a separate NTM controller 109, a volatile memory 110 (such as DRAM) or other working memory, an NVM interface 112 (which may be referred to as a flash interface), and an NVM array 114. The NVM array 114 includes one or more NAND dies, each configured with (a) a first portion of memory for use as main memory 115 and (b) a second portion of memory for use as an NTM memory bank 117. The main memory 115 corresponds to a first set of physical memory addresses within the NVM array 114 that are allocated to the SSD controller 108 and accessed by an NVM controller 116 via the NVM interface 112. The NVM controller 116 is configured to access NVM physical addresses allocated to the SSD using an NVM management component (e.g., an FTL). The NTM memory bank 117 corresponds to a second set of physical memory addresses within the NVM array 114 that are allocated to the NTM controller 109 and are directly accessed by the NTM controller 109 (i.e., not via the NVM interface 112) so as to bypass the NVM management components of the SSD controller 108 (e.g., to bypass FTL operations that would otherwise be performed in conjunction with reads from the NVM array 114). Note that the NTM controller 109 and the NTM memory bank 117 may be collectively referred to as an NTM module. In some examples, the NTM memory bank 117 may be a separate partition of the NVM array. In other examples, it is just a separate portion of the NVM array. Note also that, although described primarily with reference to examples where the NTM controller 109 is a component of the SSD 104, the NTM controller 109 instead may be separate from the SSD 104.

The portion of NVM array 114 allocated to the SSD controller 108 may also be referred to as user data memory since, for the most part, it will store user data provided by the host 102. However, other types of data may be stored in the main memory 115, such as other types of non-NTM data provided by the host 102 or the SSD controller 108. Also, in some examples, some NTM data may be stored in main memory 115 as well. The portion of NVM array 114 allocated to the NTM controller 109 is referred to as NTM memory bank 117 since, for the most part, it will store NTM memory bank data provided by the NTM controller 109. However, other types of data may be stored in the NTM memory bank 117.

The host interface 106 is coupled to the SSD controller 108 and facilitates communication between the host 102 and the SSD controller 108. The SSD controller 108 is coupled to the volatile memory 110 as well as to the main memory 115 portion of the NVM array 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

Although, in the example illustrated in FIG. 1, SSD 104 includes a single channel between SSD controller 108 and NVM die(s) 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The SSD controller 108 may be implemented in a single integrated circuit chip and may communicate with different layers of memory in the NVM die(s) 114 over one or more command channels.

The SSD controller 108 controls operation of the SSD 104 (excluding, for example, the operations of the NTM controller 109). In various aspects, the SSD controller 108 receives commands from the host 102 through the host interface 106 and performs the commands to transfer data between the host 102 and the main memory 115 of the NVM array 114. As shown in FIG. 1, the NVM controller 116 of the SSD controller 108 is configured to access the NVM physical addresses correspond to main memory 115 using flash management components (e.g., an FTL), which may include firmware (FW)-based components. (Some of these components may be within the NVM/flash interface 112.) That is, the SSD controller 108 may include FW-based flash management components or memory management components for managing the main memory 115 of the NVM array 114. Furthermore, the SSD controller 108 may manage writing/reading to/from volatile memory 110 to perform the various functions effected by the SSD controller 108 and to maintain and manage cached information stored in the volatile memory 110.

The NTM controller 109 is also connected the host interface 106 to receive NTM-specific commands and data from the host 102 (such as NTM input training data) and to send command replies and output data to the host 102 (such as trained NTM neural network parameters). The NTM controller 109 may also be connected to volatile memory 110 (or to a separate volatile memory, not shown) for writing and reading from/to volatile memory. The NVM array 114 may also include at least some on-chip NTM computational components as well as at least some on-chip user data computation components.

The SSD controller 108 and the NTM controller 109 may include any type of processing device, such as a microprocessor, a microcontroller, an embedded controller, a logic circuit, software, FW, or the like. In some aspects, some or all of the functions described herein as being performed by the SSD controller 108 or the NTM controller 109 may instead be performed by another element of the SSD 104. For example, the SSD 104 may include a microprocessor, a microcontroller, an embedded controller, a logic circuit, software, FW, or any kind of processing device, for performing one or more of the functions described herein as being performed by the SSD controller 108 or the NTM controller 109. According to other aspects, one or more of the functions described herein as being performed by the SSD controller 108 or the NTM controller 109 are instead performed by the host 102. In still further aspects, some or all of the functions described herein as being performed by the SSD controller 108 or the NTM controller 109 may instead be performed by another element such as a controller in a hybrid drive including both non-volatile memory elements and magnetic storage elements.

The volatile memory 110 may be any suitable memory, computing device, or system capable of storing data. For example, the volatile memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or other fast non-volatile memory such as storage class memory (e.g., MRAM, ReRAM, PCM) or the like. In various embodiments, the SSD controller 108 and the NTM controller 109 use the volatile memory 110, or a portion thereof, to store data during the transfer of data between the host 102 and the NVM array 114. For example, the volatile memory 110 or a portion of the volatile memory 110 may be a cache memory. The NVM array 114 receives data from the SSD controller 108 via the NVM interface 112 and stores the data in the main memory 115. The NVM array 114 may be any suitable type of non-volatile memory, such as a NAND-type flash memory or the like. In some embodiments, volatile memory 110 may be replaced by a non-volatile memory such as MRAM, PCM, ReRAM, etc. to serve as a working memory for the overall device.

In the example of FIG. 1, the NTM controller 109 may include hardware, FW, software, or any combinations thereof that provide an NTM, MANN, and/or RNN controller for use with the NTM memory bank 117. The NTM controller 109 may also be configured to perform various NTM operations on the data in the NTM memory bank 117 such as NTM read head and NTM write head operations.

Although FIG. 1 shows an exemplary SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for NTM processing that are described herein. The processor could, as one example, off-load certain NTM processing tasks from the NTM controller 109 to the NVM and associated circuitry and/or components.

FIG. 1 thus illustrates a hybrid memory management system that provides, among other features, flash-management FW level control of the main memory 115 by the NVM controller 116 of the SSD controller 108, while also allowing direct NTM-based dynamic memory management operations on the NTM memory bank 117 by the NTM controller. In this manner, the system allows for self-directed memory accesses by the NTM controller 109 to the NTM memory bank 117. Thus, a NAND-based NTM system is provided, which may include a self-NTM-NAND management system. This "dual-flavor" memory management system allows an autonomous direct management of a pre-allocated NAND flash region (e.g., the NTM memory bank 117), whereas the memory controller functions for the rest of the NVM array (e.g., main memory 115) can still be performed by FW in the SSD controller 108. Moreover, the host 102 need not manage the low level memory management of either portion of the NVM array 114.

In some examples, as will be explained below, the NTM memory bank 117 may be controlled by the SSD controller 108 during a later stage of an NTM procedure (or whenever the NTM controller 109 requests such control by the SSD controller). This mechanism may allow for faster and more accurate convergence of the NTM to an optimal solution with less running time and fewer computations (especially when those computations are otherwise redundant) while allowing the NTM controller 109 to spend more of its time in "valuable-to-learning" actions. This may serve to enhance the functionality of the NTM controller 109 as the memory management of the NTM memory bank 117 can be altered during the algorithmic processing procedures of the NTM for cost function optimization. It may also reduce latency and power overhead that is associated with processes of the FW flash management of SSD controller 108 that are not imperative to the operation of the NTM.

Among other features, SSD controller 108 allocates a certain physical address range for use by the NTM controller 109 to store the to the NTM memory bank 117. The NTM controller 109 then manages this physical address range in an independent (autonomous) manner, such that it may optimize its own NTM-operations directly with the NVM array 114, as well as reducing the flash-management overhead of the NVM controller 116. The memory management of the rest of the NVM array 114 can be operated using otherwise standard FW-based management methods such as FTL methods (thus benefiting from optimized FW-based management procedures available in state-of-the-art flash drives).

It should be noted that the storage controller management of the NVM array 114 performed by the data storage controller 108 may be deterministic, i.e. the memory management operations it performs may be executed according to embedded FW code in a pre-defined manner, whereas the operation of the NTM controller 109 may be non-deterministic as the NTM learns the optimized operation rules in a dynamic manner over device lifetime, in accordance with current device conditions.

Thus, among other aspects, a system is described that provides: 1) allocation of a NAND region dedicated for NTM operations; 2) hybrid memory management system with dual controller-intervention levels (i.e., a main memory management module shown as controller 116) with a FW-based memory controller system (e.g., controller 108) and an NTM controller (e.g., controller 109) with a direct (autonomous) memory management; where 3) the main memory management module (e.g., controller 116) is operated with a FW-based deterministic nature, whereas the NTM controller (e.g., controller 109) is operated in a non-deterministic manner (in accordance with NTM operations).

Still further, in some aspects, the NTM controller 109 is configured to perform additional or alterative functions such as 1) wearing leveling that is different from the wear leveling (WL) performed by the SSD controller 108, 2) read threshold calibration (RTC) that is different from the wear leveling performed by the SSD controller 108, 3) ECC that is different from ECC performed by the SSD controller 108 and may include, for example, majority rules ECC, 4) ECC that is different from ECC performed by the SSD controller 108 and may include, for example, majority rules ECC, and 5) selective data scrambling of the NTM memory bank data. Still further, the NTM controller 109 may be configured to implement different data management functions based on an NTM loss function. These features will be described in detail below.

Figure 2:
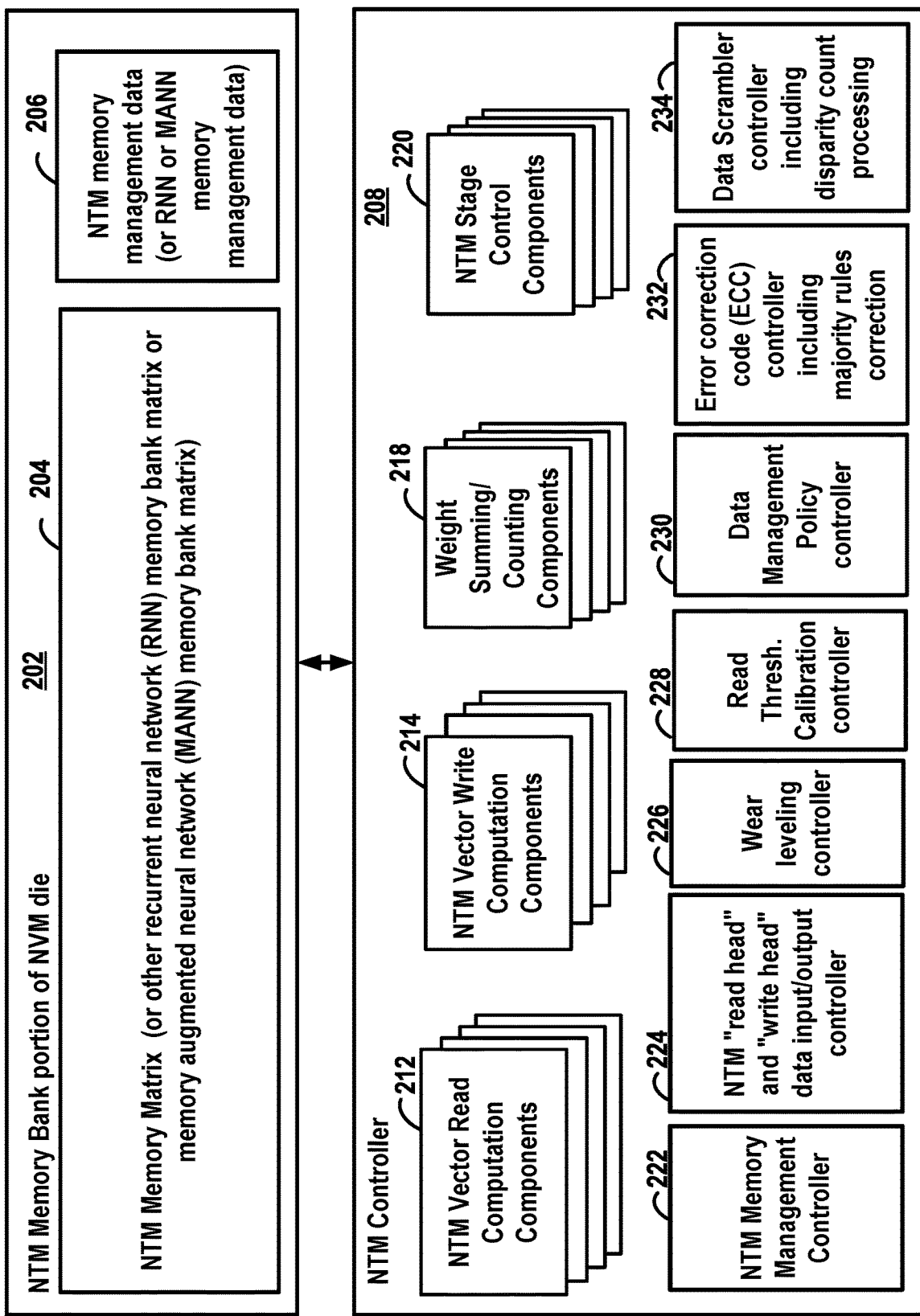
FIG. 2 illustrates an exemplary NVM array die that stores an NTM matrix or memory bank, and an NTM controller that accesses the NTM matrix.

FIG. 2 illustrates a block diagram of an exemplary NTM memory bank 202 portion of an NVM die configured to store an NTM memory matrix 204 (or other RNN memory bank matrix or MANN memory bank matrix) and NTM memory management data 206 (e.g., any NTM memory management data that should be stored in NVM, or other RNN memory management data or MANN memory management data). In some examples, the NTM memory bank portion 202 corresponds to the NTM memory bank 117 of FIG. 1. FIG. 2 also illustrates an NTM controller 208 (which, in some examples, corresponds to NTM controller 109 of FIG. 1). Not all circuit or memory components that might be used in a practical NVM die are illustrated in the figure, such as input/output components, voltage regulation components, clocks and timing components, etc. Rather only some components and circuits are shown, summarized as block or schematic diagrams.

The NTM controller 208 of FIG. 2 includes components configured to perform or control NTM computational operations. In the example of FIG. 2, the exemplary NTM components 210 include: one or more NTM vector read computation components 212 configured to perform at least some vector read operations on data stored in NTM memory matrix 204 (which may include at least some of the aforementioned read head computations); one or more NTM vector write computation components 214 configured to perform at least some vector write operations on data stored in NTM memory matrix 204 (which may include at least some of the aforementioned write head computations); one or more weight summing and/or counting components 218 configured to sum and/or count certain weights, as will be described below; and one or more NTM stage control components 220 configured to control various functions depending on the stage of the NTM processing, as also described below. Multiple instances of each NTM component (e.g., 212, 214, 218, and 220) are shown since, in some examples, a plurality of such devices may operate in parallel, e.g., for use with NTM data maintained across an array of dies as a meta-block of data. Furthermore, at least some of these components (such as 212, 214, 218, and 220) may be configured on-chip, i.e., on the NVM die that holds the NTM memory matrix using, for example, under-the-array or next-to-the-array circuitry. Some of these components may be configured to accelerate convergence.

The NTM controller 208 of FIG. 2 also includes: an NTM memory management controller 222 configured to update the memory management data 206; an NTM "read head" and "write head" data input/output controller 224 configured to input/output NTM data associated with NTM read head and write operations to/from the host 102 of FIG. 1; a wear leveling controller 226 (which may perform a different wear leveling procedure on the NTM memory bank 202 than the wear leveling performed on other portions of the NVM by the SSD controller 108); a read threshold calibration controller 228 (which may perform a different read threshold calibration procedure on the NTM memory bank 202 than the read threshold calibration performed on other portions of the NVM by the SSD controller 108); a data memory management policy controller 230 (which may implement different data memory management policies for the NTM memory bank 202 than the policies applied to other portions of the NVM by the SSD controller 108); an ECC controller 232 configured to control any ECC applied to data as it is read from or written to the NTM memory matrix 204, which may perform, in some examples, a majority-rules based error correction procedure; and a data scrambler controller 234, which may scramble and unscramble data as it is written to and then read from the NTM memory bank 202. The data scrambler controller 234 may be configured to perform disparity-count based processing. The operations of these components will be described in greater detail below.

Note that not all of the features shown in FIG. 2 are required. For example, in some embodiments, the NTM controller will omit the wear leveling controller 226, the read threshold calibration controller 228, the data management policy controller 230, the ECC controller 232, and the data scrambler controller 234. Some of these functions may instead be performed by the SSD controller (e.g., controller 108) or omitted entirely. With regard to ECC, data storage controllers may be configured to perform ECC decoding and encoding by default whenever reading from or writing to an NVM. By limiting ECC to only data stored in portions of the NVM that are separate from the NTM memory bank, and performing no ECC on data in the NTM memory bank, power savings and speed enhancements can be achieved. In some aspects, ECC is applied to some blocks in the NTM memory bank but not others (e.g., strong blocks vs. weaker blocks as determined, for example, by program/erase cycles). Similar considerations apply to wear leveling and read threshold calibration.

In embodiments where both the data storage controller 108 and the NTM controller 109 are configured to perform operations such as wear leveling, read threshold calibration, and ECC, the data storage controller 108 may be configured to perform its operations on portions of the NVM die that exclude the NTM memory bank, whereas the NTM controller 109 may be configured to perform its operations on the storage blocks of the NTM memory bank (117/202). Different versions of these operations may be performed based on different parameters, thresholds, or the like. For example, the data storage controller may be configured to perform a first wear leveling procedure, first ECC procedure, or first read threshold calibration procedure on one portion of the NVM array, whereas the NTM controller is configured to perform a second wear leveling procedure that is different from the first wear leveling procedure, a second ECC procedure that is different from the first ECC procedure, or second read threshold calibration procedure on the NTM memory bank that is different from the first read threshold calibration procedure. Some examples are discussed below.

Figure 3:
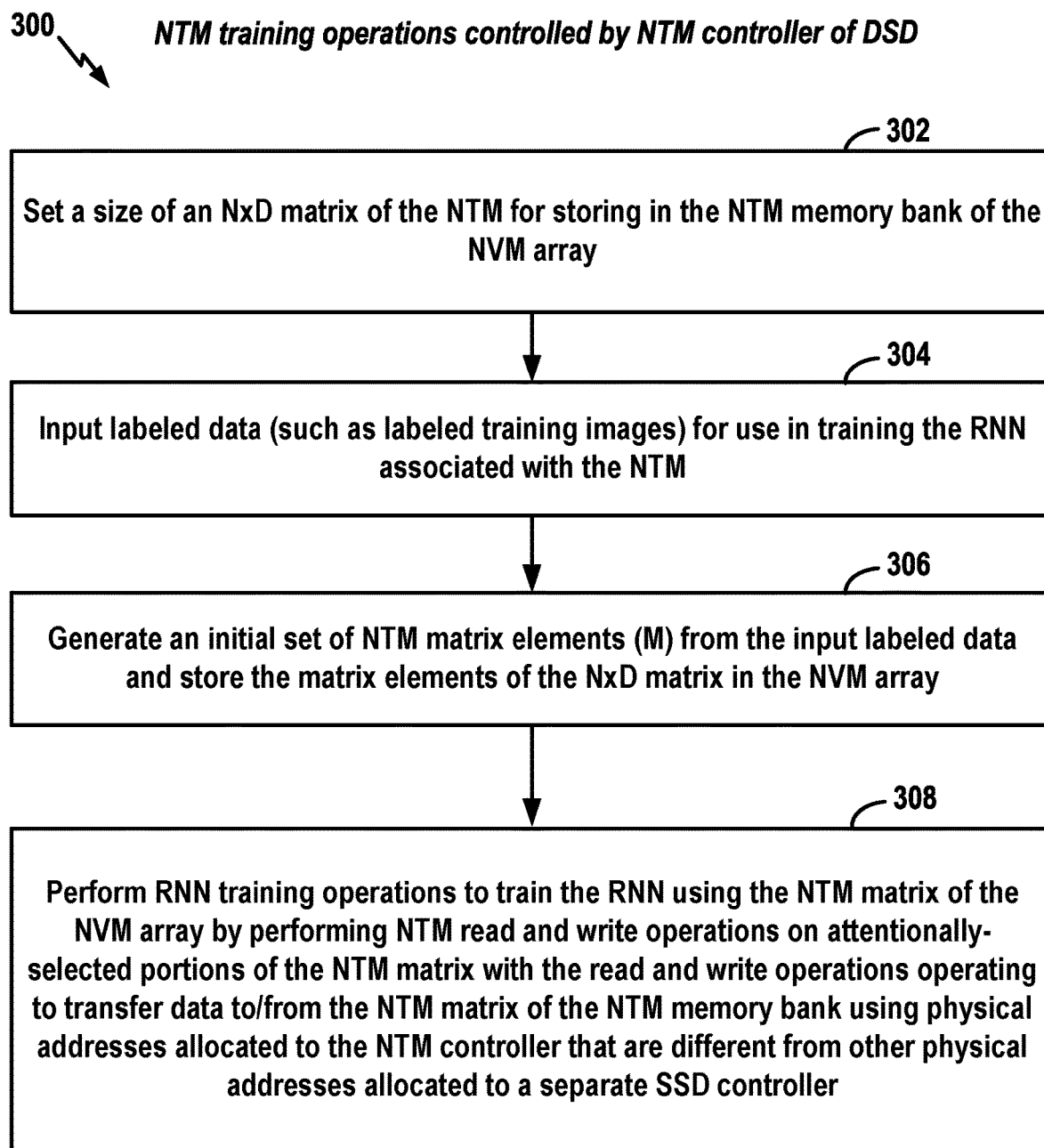
FIG. 3 illustrates an exemplary method for NTM training controlled by an NTM controller based on data stored in an NTM memory bank in an NVM array.

FIG. 3 illustrates an exemplary method 300 for use with NTM processing according to aspects of the present disclosure wherein the NTM processing is performed or controlled by an NTM controller (such as NTM controller 109 of FIG. 1 or 208 of FIG. 2) based on data stored in an NTM memory bank of an NVM. Beginning at block 302, the NTM controller determines or sets a size of the N×D matrix of the NTM, which may be determined in accordance with standard techniques based on the needs of a particular RNN. At block 304, the NTM controller inputs labeled data (such as labeled RNN training images) for use in training the RNN associated with the NTM. At block 306, the NTM controller generates an initial set of NTM matrix elements (M) from the input labeled data and stores the matrix elements of the N×D matrix in the NVM array. At block 308, the NTM controller performs RNN training operations to train the RNN using the NTM by performing NTM read head and write head operations on attentionally-selected portions of the NTM matrix with the read head and write head operations transferring data to/from the NTM matrix using physical addresses allocated to the NTM controller that are different from other physical addresses allocated to a separate SSD controller. Exemplary read head and write head operations that are applied to attentionally-selected portions of the NTM matrix are set forth above in Equations (1)-(4), above.

Figure 4:
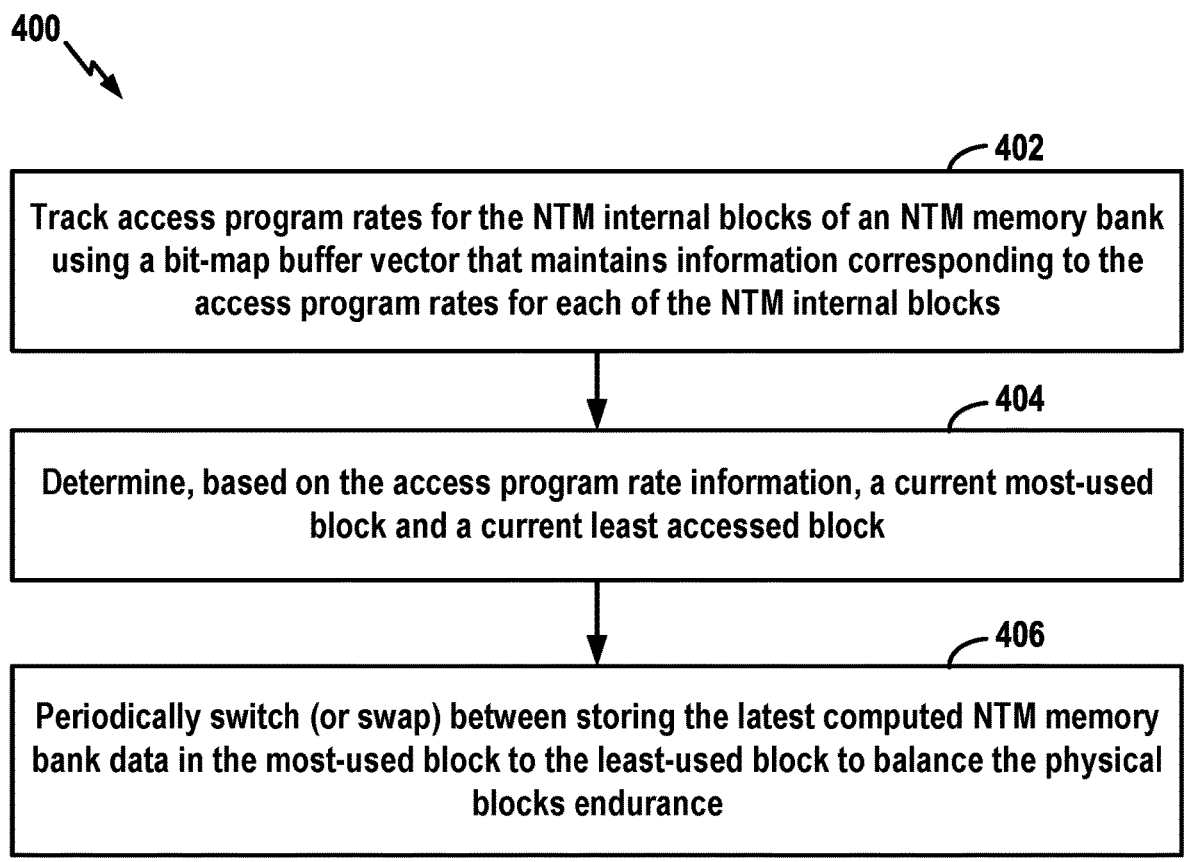
FIG. 4 illustrates an exemplary method for use by an NTM controller to control endurance balancing/wear leveling within an NTM memory bank in an NVM array.

FIG. 4 illustrates a method 400 of wear leveling/endurance balancing that may be performed or controlled by an NTM controller, such as the NTM controller 109 of FIG. 1 or other suitably equipped devices. The NTM controller holds a "bit-map" buffer vector (which can contain several bits-per-address) and tracks or determines values representative of an access program rate for different NTM internal blocks within the NTM memory bank (such as memory bank 117 of FIG. 1). In some aspects, the bit-map corresponds to the entire NTM memory bank. The access program rate may be a program-count-per-NTM-block value that is representative of how many times a particular block has been programmed (i.e., written to) and therefore provides information on the most-used blocks and the least used-blocks within the set of blocks devoted to the memory bank. The blocks that have the highest access program rates are the most-used blocks since they are accessed the most. The blocks that have the lowest access program rates are the least-used blocks since they are accessed the least. Using this information, the NTM controller switches once in a predefined period of time between the current most-used block and the current least-used block, so as to balance the physical blocks endurance. This wear leveling procedure may be performed instead of the complex wear leveling operations as may be performed by an SSD controller (e.g., controller 108 of FIG. 1) on other blocks within the NVM that are not allocated to the NTM memory bank. In this manner, the NTM controller performs a form of self-endurance-balancing to maintain bit error rates (BER) about the same from block to block within the NTM memory bank. This may reduce access latencies to the NTM memory bank in the NVM and therefore allow the NTM controller to converge on a solution to its NTM algorithm more quickly.

Beginning at block 402 of FIG. 4, the NTM controller tracks or determines an access program rate (which may also be referred to just as a program rate) for the NTM internal blocks of the NTM memory bank. As noted above, the access program rate indicates how often a particular block is programed (written). This information may be represented by a series of bits, which are maintained within a bit-map buffer held by the NTM controller (e.g., within a buffer held in volatile memory used by the NTM controller, such as volatile memory 110 of FIG. 1). At block 404, the NTM controller determines, based on the access program rate information, a current most-used (or most-accessed) block and a current least-used (or least-accessed) block. At block 406, the NTM controller periodically switches or swaps between storing its latest computed NTM memory bank data in the most-used block to the least-used block to balance the physical blocks endurance. For example, a timer may be tracked and the switching may occur every X milliseconds where X is a programmable value.

Figure 5:
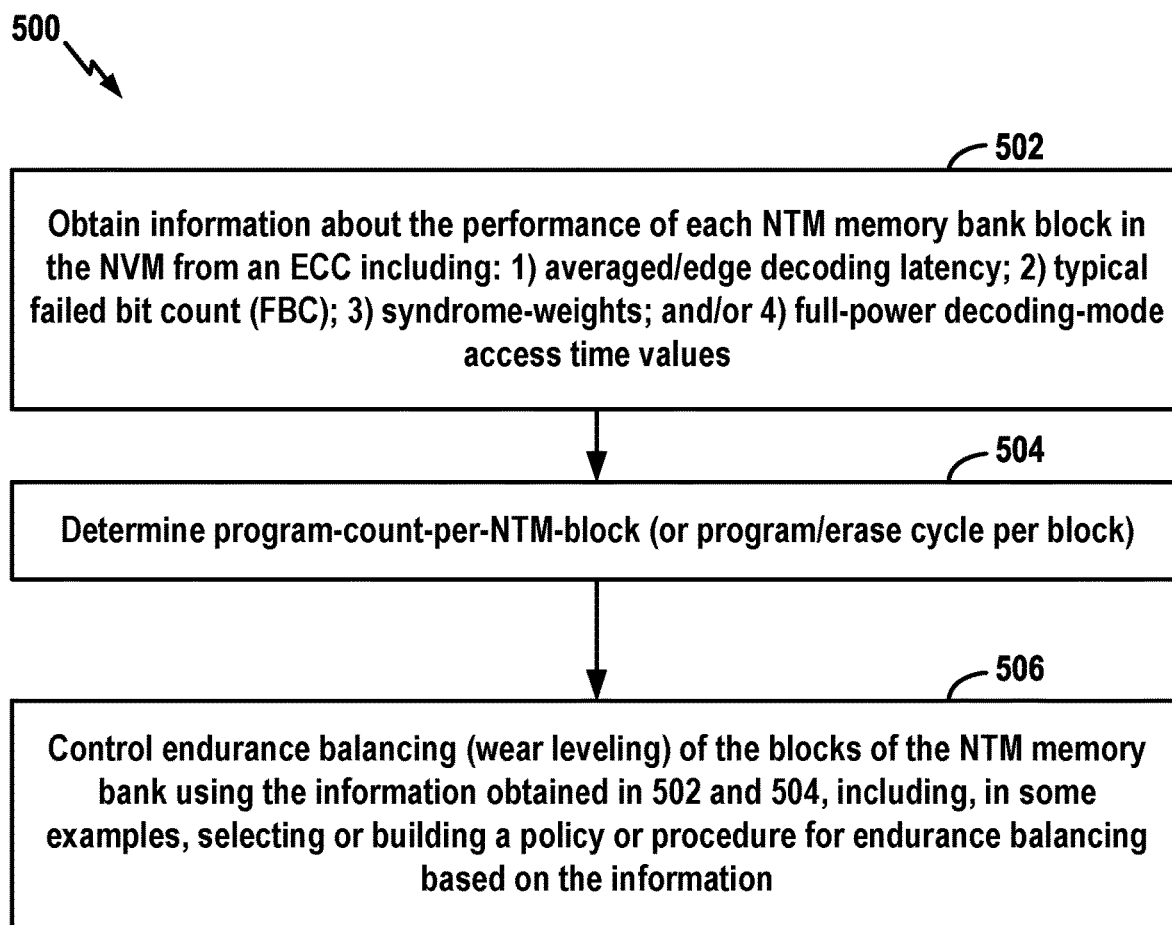
FIG. 5 illustrates another exemplary method for use by an NTM controller to control endurance balancing/wear leveling within an NTM memory bank in an NVM array.

FIG. 5 illustrates another method 500 of wear leveling/endurance balancing that may be performed or controlled by an NTM controller, such as the NTM controller 109 of FIG. 1 or other suitably equipped devices. In this embodiment, the NTM controller obtains information about the performance of each NTM memory bank block from an ECC engine (e.g., ECC controller 232 of FIG. 2 or an ECC controller within the SSD controller 108 of FIG. 1), including one of more of 1) averaged/edge decoding latency; 2) typical failed bit count (FBC) per block; 3) syndrome-weights; and 4) full-power decoding-mode access time values. The NTM controller uses this information, together with its own self-tracking of a program-count-per-NTM-block or program/erase cycles (PEC), for endurance balancing of NTM-allocated physical blocks (e.g., blocks within the memory bank 117 of FIG. 1). In some examples, the NTM controller may select, build, or otherwise establish a policy (or procedure) for endurance balancing based on the parameters.

Briefly, decoding latency refers to the time it takes an ECC controller to decode data read from an NVM that may have various errors. The ECC controller may track both an average latency value, as well as an edge value representative of more challenging decoding cases where more bits are in error. FBC represents the number of bad (i.e. flipped) bits detected by the ECC controller. A syndrome-weight provides an indication of the general number of remaining bit errors in a given data block during ECC decoding. The full-power decoding-mode access time refers to the amount of time it takes the ECC, when operating at full power, to read from or program (write) to a block in the NVM. Each of these values represents an indication of how worn a particular block of memory is within the NVM. Accordingly, any or all of these parameters can be used by the NTM controller, in combination with program-count-per-NTM-block or PEC, to control wear leveling. The NTM controller may select some combination of these parameters (in accordance with pre-programming of the NTM controller) for use in controlling wear leveling.

Beginning at block 502 of FIG. 5, the NTM controller obtains information about the performance of each NTM memory bank block in the NVM from an ECC (such as the ECC or the SSD controller) including: 1) averaged/edge decoding latency; 2) typical FBC; 3) syndrome-weights; and/or 4) full-power decoding-mode access time values. At block 504, the NTM controller determines or tracks the program-count-per-NTM-block (or the PEC per block). At block 506, the NTM controller controls endurance balancing (wear leveling) of the blocks of the NTM memory bank using the information obtained in blocks 502 and 504, such as by selecting blocks for programing (write) of newly computed NTM data that exhibit relatively little wear (as indicated by the parameters) while avoiding blocks that exhibit relatively more or higher wear (as indicated by the parameters). In some examples, the NTM controller may select or build a policy or procedure for endurance balancing based on the information that has been collected. For example, the NTM controller may choose an endurance policy that operates to achieve some combination of performs goals based on selected parameters, such as to minimize FBC and program-count-per-NTM-block over all blocks.

Figure 6:
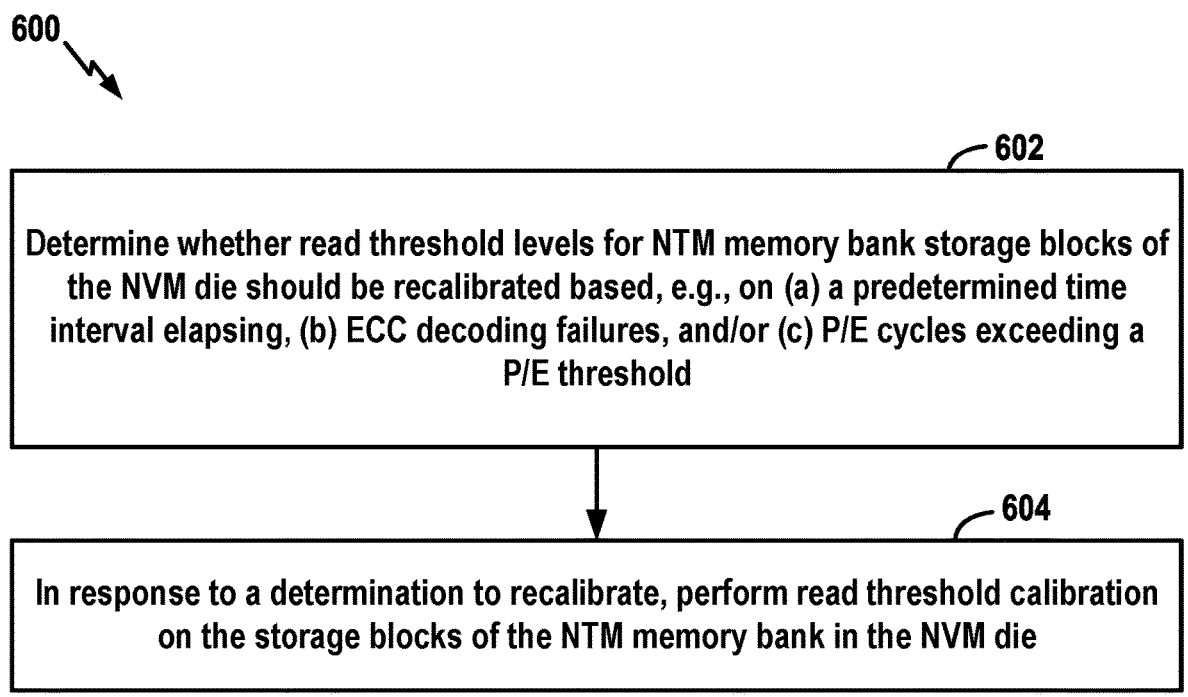
FIG. 6 illustrates an exemplary method for use by an NTM controller to control read threshold calibration within an NTM memory bank in an NVM array.

FIG. 6 illustrates method 600 of read threshold calibration that may be performed or controlled by an NTM controller, such as the NTM controller 109 of FIG. 1 or other suitably equipped devices. Read thresholds in an NVM die may deviate from default values as a result of external conditions such as changes in device temperature or other factors affecting data retention and/or due to a large number of program/erase (P/E) cycles. Read threshold calibration is ordinarily performed by a data storage controller and can be a relatively long process. By configuring an NTM controller (e.g., controller 109) to control read threshold calibration of the storage blocks of the NTM memory bank (e.g., bank 117) separately from the data storage controller (e.g., controller 108), it may be possible to avoid the need for read threshold calibration by the data storage controller or at least reduce the frequency of read threshold calibration by the data storage controller so that the overall DSD may operate faster consume less power. For example, a different (and higher, less stringent, or laxer) ECC failure rate threshold may be used for the ECC of the NTM (and applied to data read from the NTM memory bank) than for the ECC of the data storage controller (and applied to data read from other portions of the NVM die. Likewise, a different (and higher or laxer) P/E threshold may be used may be used for the NTM than for the data storage controller. Either can effectively reduce the frequency of read threshold calibration, at least compared to a DSD that would apply lower (and stricter) thresholds to the entire NVM die.

Beginning at block 602 of FIG. 6, the NTM controller determines whether read threshold levels for NTM memory bank storage blocks of the NVM die should be recalibrated based, e.g., on (a) a predetermined time interval elapsing, (b) ECC decoding failures, and/or (c) P/E cycles exceeding a P/E threshold. So, for example, the NTM controller may be configured to perform read threshold calibration one every week or month. ECC decoding failure information can be provided by the ECC controller of the NTM controller (e.g., ECC controller 322 of FIG. 2). If the ECC failure rate (or some other suitable failure metric) exceeds a threshold, read threshold calibration can be triggered. Likewise, once a total number of P/E cycles for the NTM memory bank storage blocks exceed a P/E threshold, read threshold calibration can be triggered. At block 604, in response to a determination to recalibrate, the NTM controller performs read threshold calibration on the storage blocks of the NTM memory bank in the NVM die.

Figure 7:
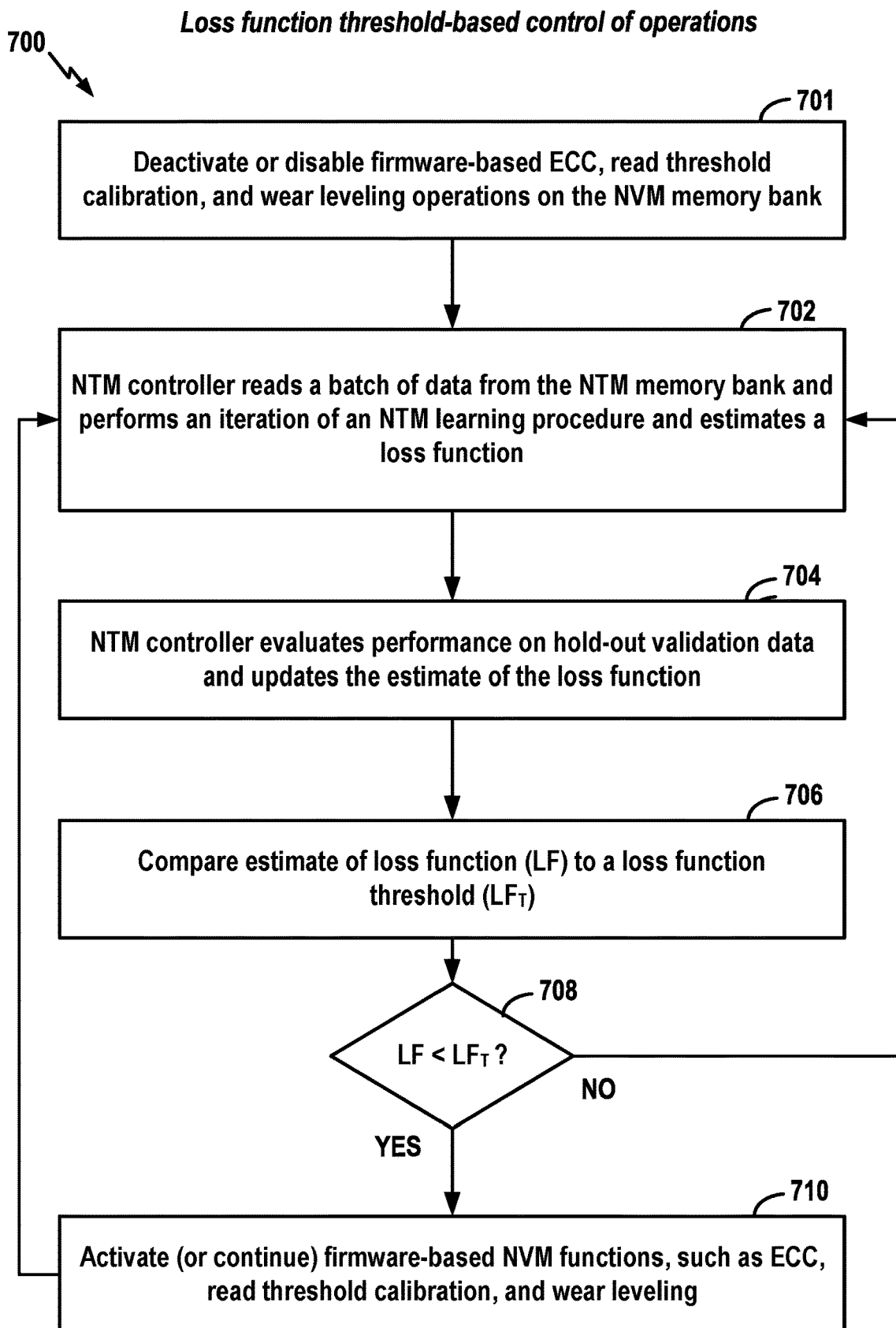
FIG. 7 illustrates an exemplary method for use by a DSD having an NTM controller and a data storage controller to control NTM operations based on loss functions.

FIG. 7 illustrates method 700 that may be performed or controlled by a DSD having an NTM controller, such as the NTM controller 109 of FIG. 1, and a separate data storage controller, such as the data storage controller 108 of FIG. 1, or other suitably equipped devices. In this example, during a first phase of operations, while a NTM loss function that is to be optimized by the NTM controller is above some threshold, firmware components of the DSD are operated according to a custom policy, e.g., there is no ECC encoding or decoding, and read threshold calibration is disabled to allow fastest operation while sustaining elevated BER figures. In a second phase, when the loss function falls below the threshold, finer operations are implemented wherein wear leveling is applied, read threshold calibration is conducted more frequently, and ECC is fully operated. This may be done to reduce the bit error rate (BER) and allow for more accurate NTM calculations.

Beginning at block 701 of FIG. 7, the NTM controller (or the DSD in which it is implemented) deactivates or disables any FW-based ECC, read threshold calibration and wear leveling operations on the NTM memory bank portion of the NVM, e.g., operations that would otherwise be performed by a FW component of the data storage controller 108 of FIG. 1. At block 702, the NTM controller reads a batch of data from the NTM memory bank and performs an iteration of an NTM learning procedure and estimates a loss function (which may also be referred to as a cost function or an error function and is generally representative of a prediction error of the RNN associated with the NTM). During this first phase, the operations of block 702 are performed without the FW-based ECC, read threshold calibration and wear leveling functions and so the data read from the NTM memory bank may have uncorrected errors. However, during this initial phase, such errors are not problematic and, indeed, any such errors or "noise" introduced into the data may help the NTM procedure converge toward a solution. In this regard, many machine language algorithms or procedures running on an NTM may gain from the errors produced as a result of avoiding ECC decoding as a form of regularization. Machine learning algorithms employ different techniques such as dropout or data augmentation that may add noise to the data to avoid overfitting. The method of FIG. 7 allows a form of regularization during the first phase of the processing, such that a regularization effect may be achieved without any explicit regularization procedures.

At block 704, the NTM controller evaluates performance on hold-out validation data (which may also be obtained from the NTM memory bank) and updates the estimate of the loss function. Hold-out validation data is data not used during NTM training. At block 704, the NTM controller compares the estimate of the loss function (LF) to a loss function threshold ($LF_T$). So long as the loss function remains above (or equal to) the loss function threshold (as indicated by decision block 708), the NTM controller continues to iteratively perform the operations of blocks 702, 704, and 706 to read more data and update the loss function without any FW-based ECC, read threshold calibration and wear leveling operations. However, once the NTM converges to the point that the loss function falls below the loss function threshold, the NTM controller (or the DSD in which it is installed) at block 710 activates FW-based ECC, read threshold calibration, and wear leveling operations on the NTM memory bank portion of the NVM. This will serve to reduce errors that might otherwise prevent the NTM procedure from fully converging on a solution. The commencement of operations at block 710 marks the completion of the first or initial stage of the NTM procedure and the beginning of the second or subsequent stage of the NTM procedure. Note that, although FIG. 7 refers to FW-based functions, the procedure of FIG. 7 may also be used to selectively activate/deactivate any software-based versions of ECC, read threshold calibration, and wear leveling, such as software-based versions implemented within the NTM controller or elsewhere.

Described so far are methods and apparatus to, e.g., implement an NTM using flash memory. The methods and apparatus can enhance emerging technologies such as NTMs in the world of artificial intelligence (AI). The dual-independency level memory management systems described above allow a DSD to maintain the regular features of FW-based memory management (with no requirement for host intervention), while also allowing an efficient NTM-NAND synergy by an autonomous direct NVM NAND handling of the NTM module.

In the following, various error correction systems and techniques are described for use with data stored in an NTM memory bank on an NVM or for use with other NVM data. Majority Rules-Based Error Correction for Use with Neural Network Data Stored in NVM Generally speaking, for NTM systems or other systems where media bit error rates are reasonably low, the odds of encountering bit errors that coincide on the same bit in multiple locations is very low, and so it is possible to accelerate processing by using a majority wins procedure. Since neural networks are highly tolerant to faults, the occurrence of two bit errors coinciding with one another (i.e., lining up) is very rare and generally does not affect the neural network processing. That is, any such errors, even if uncorrected, would not likely affect neural network processing, which can tolerate such errors and, as discussed above, might provide for some beneficial regularization.

Accordingly, bit disagreements in neural network data read from the NVM array may be tabulated for each access and, once a threshold indicating too many bit errors is crossed, rewriting/relocation of the data can be executed by the DSD or the host. For hybrid systems configured as in FIG. 1, the NTM controller may control or perform the procedure. In some examples, data is scrambled/descrambled to further reduce the likelihood of any bit errors occurring in the same direction (i.e., tending to flip binary zeroes to binary ones more so than flipping binary ones to binary zeroes), which may arise due to NVM array reliability issues such as charge loss or read/program disturb that can cause bit errors to be in agreement and thus missed. Hence, a scheme that exploits three versions or three copies of the same data can allow for strong bit error correction in the case of ECC, as ECC can be done individually or while factoring in the multiple copies. Note that a storage device that stores three versions or three copies of the same data might also be regarded as storing the data plus two copies of the same data. For consistency herein, the term "three copies" will be used to refer to three total versions of the same data, each of which is a copy of the data to be stored, which is sent to the storage device by the storage device controller or the host.

Figure 8:
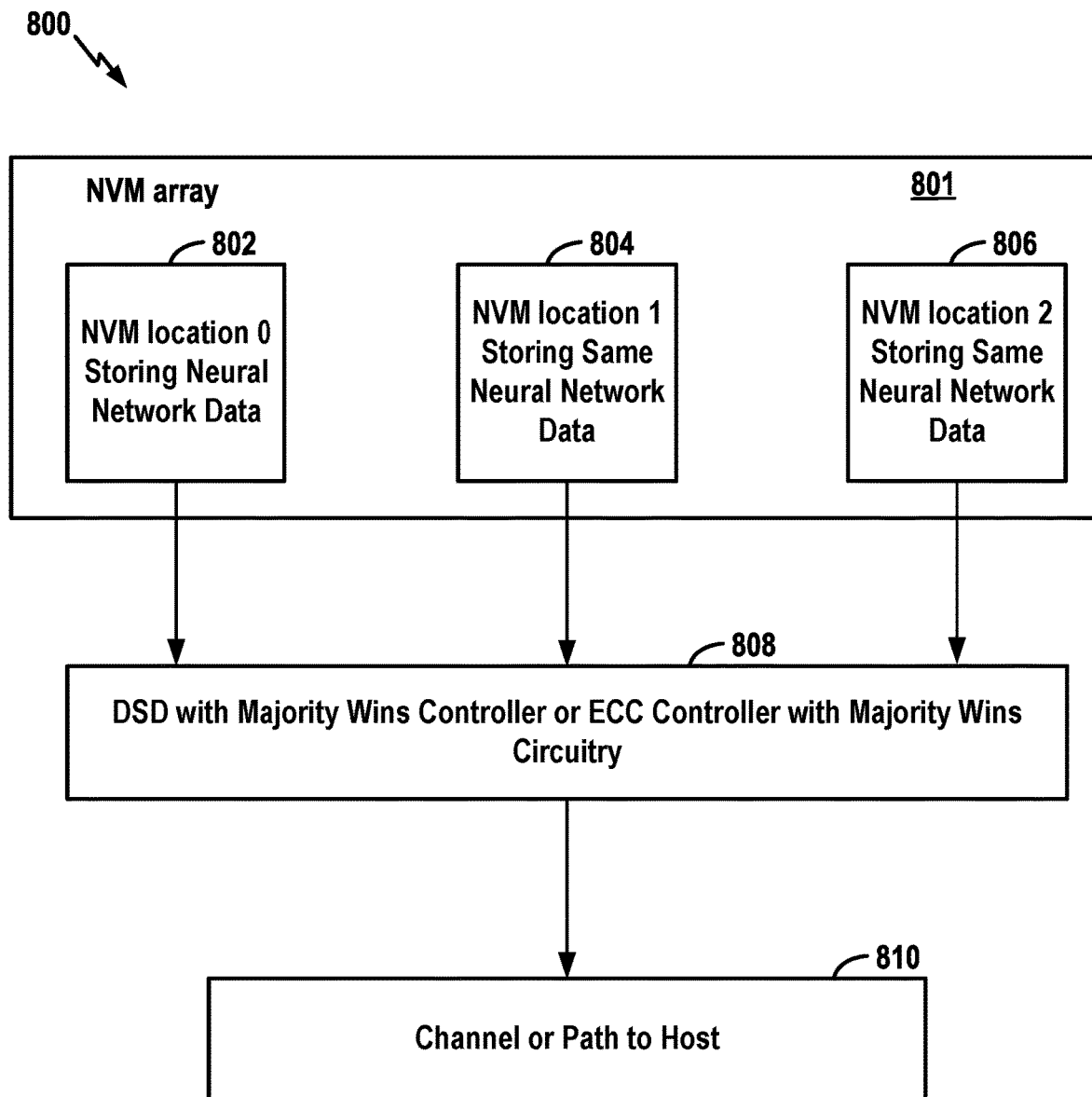
FIG. 8 illustrates a majority wins error correction procedure wherein multiple copies of neural network data are stored in an NVM array.

FIG. 8 illustrates a system 800 that stores three copies of neural network data in three separate locations of an NVM 801: NVM location 0 (802); NVM location 1 (804); and NVM location 2 (806). All three copies are read from the NVM 801 by a DSD 808 and applied to a majority wins controller of the DSD (which may be, for example, a component of the NTM controller 109 of FIG. 1) or majority wins circuitry within an ECC controller of the DSD (which may be, for example, a component of the data storage controller 108 of FIG. 1). The majority wins components of the DSD 808 determine the "winner" in case of a discrepancy between the data. This can greatly accelerate correction capabilities as the ECC engine can prioritize flipping bits that are in disagreement to quickly correct errors that might otherwise be time consuming to correct using standard ECC decoding. The system 800 can also provide for a RAID 1-style performance boost (where RAID 1 consists of an exact copy or mirror of a set of data on two or more disks or storage devices), as the data can be sourced from whatever die is available, improving bandwidth. That is, the memory locations 802, 804, and 806 can be on separate dies. The same applies to writes, as the data can be written to whatever location is available and then later written to another location as a duplicate copy.

These procedures can provide protection against write errors arising from extrinsic defects, as the odds of two or more locations failing at the same cycle and on the same page is very small for a media of any reasonable maturity. This scheme effectively lends itself to copying in place, as one location can be erased and then rewritten in place with data sourced from the other copies. The other copies are also made available to the host. These procedures also align well with the wear-leveling block-swap method described above, as blocks can be swapped one copy at a time. Note also that the media footprint of an NTM memory bank or other neural network data storage may be low relative to the total capacity of the DSD. (For example, the NTM memory bank may consume 1 GB out of a 1 TB NVM array.) Hence, any overhead associated with implementing these features for neural network data need not affect the otherwise routine processing of other user data stored in the DSD. These and other error correction procedures will now be described further with reference to the next set of figures.

Figure 9:
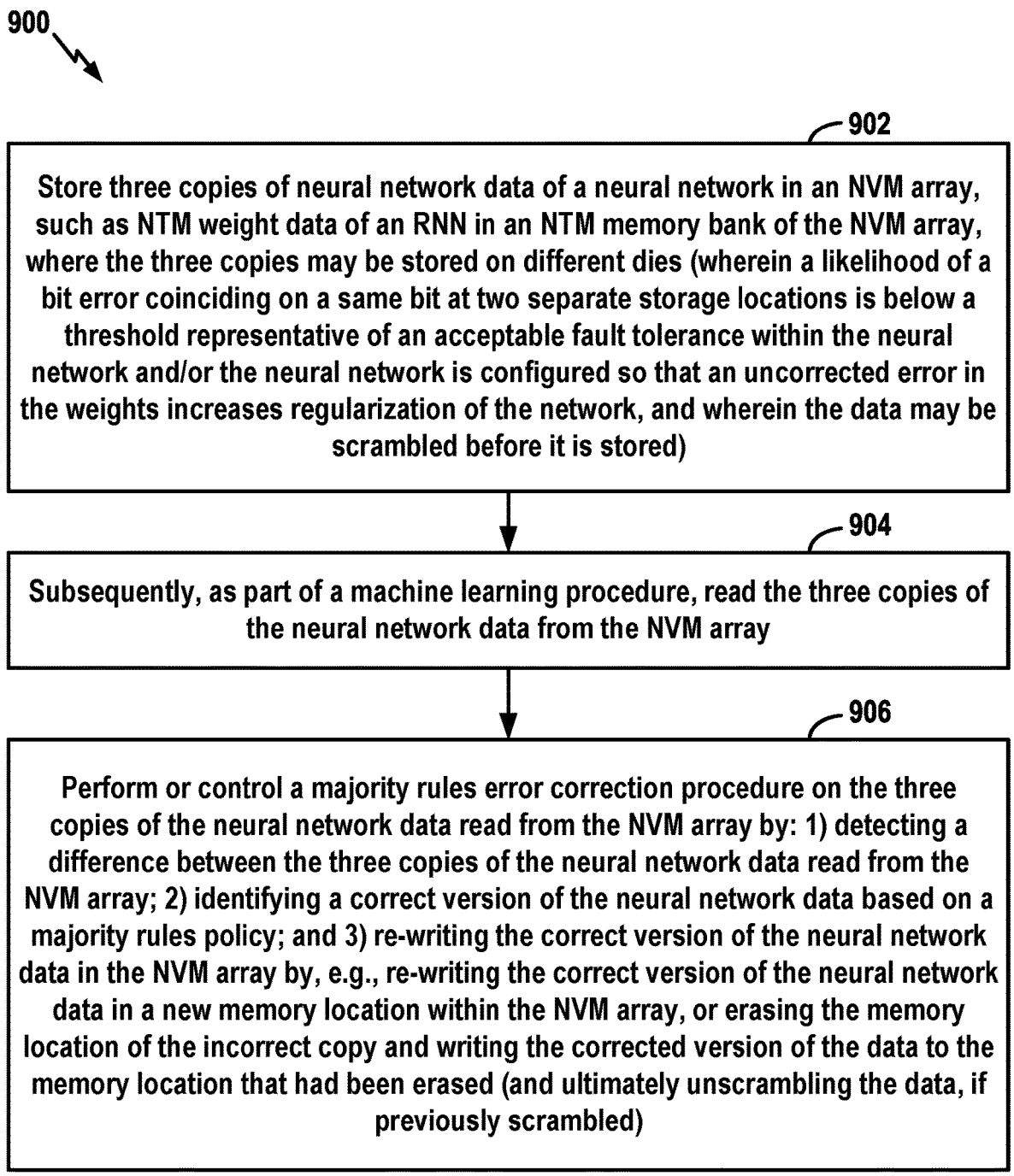
FIG. 9 illustrates an exemplary method for use by a DSD to control a majority wins error correction procedure.

FIG. 9 illustrates method 900 that may be performed or controlled by a DSD having an NTM controller (such as by the ECC controller 232 of the NTM controller 208 of FIG. 2 or the majority wins controller 808 of FIG. 8) or other suitably equipped devices for controlling/performing a majority rules-based procedure for detecting and correcting errors in neural network data stored in an NVM such as with the NTM memory bank 117 of FIG. 1. Alternatively, the procedure may be performed by majority rules circuitry within an ECC such as the ECC of the data storage controller 108 of FIG. 1, or by separate majority rules components or circuitry within the DSD.

As noted above, for systems where the odds of encountering bit errors that coincide on the same bit in multiple locations is very low, it is possible to accelerate processing by using a majority wins procedure. By way of example, weights (such as NTM weights) represent a type of data that may have a likelihood of a bit error coinciding on a same bit at two separate storage locations of the stored neural network weight data that is below a threshold representative of an acceptable fault tolerance within the neural network. Hence, an acceptable level of fault tolerance for a neural network for a particular application can be determined in advance and quantified. Then, a suitable value for the threshold can be set based on the acceptable level of fault tolerance. If weights to be stored exhibit a likelihood of a bit error (coinciding at the same bit at two separate storage locations) that is below the threshold, a majority rules error correction procedure may be used; otherwise conventional ECC may be used. Hence, a device may be provided that determines the type of input data and performs normal ECC on regular data, e.g., user data, control data, or other data that is not neural network data (i.e., non-neural network data), but performs a separate majority rules error correction procedure on neural network data such as neural network weights. The weight data can also be scrambled before it is stored in the three locations, then unscrambled after it has been read back and after the majority rules procedure has been applied.

Beginning at block 902, the NTM controller stores three copies of neural network data of a neural network in an NVM array, such as storing a batch of NTM data of an RNN in an NTM memory bank of the NVM array (wherein a likelihood of a bit error coinciding on a same bit at two separate storage locations is below a threshold representative of an acceptable fault tolerance within the neural network and/or the neural network is configured so that an uncorrected error in the weights increases regularization of the network, and wherein the data may be scrambled before it is stored). See, again, the example, of FIG. 8 where three copies of the same data are stored in three NVM locations. The three locations may be on different NVM dies. Subsequently, at block 904, as part of a machine learning procedure or other data processing procedure, the NTM controller reads the three copies of the neural network data from the NVM array. This may be part of one iteration of an iterative procedure, as the iterative procedure of FIG. 7.

At block 906, the NTM controller performs or controls a majority rules error correction procedure on the three copies of the neural network data read from the NVM array by: 1) detecting a difference between the three copies of the neural network data read from the NVM array; 2) identifying a correct version of the neural network data based on a majority rules policy; and 3) re-storing or re-writing the correct version of the neural network data in the NVM array by, e.g., re-storing or re-writing the correct version of the neural network data in a new memory location within the NVM array, or erasing the memory location of the incorrect copy and writing the corrected version of the data to the memory location that had been erased, or otherwise refreshing the data (and ultimately unscrambling the data, if previously scrambled).

Detecting a difference between the three copies may be performed, for example, by reading each copy into a latch and then detecting any bit differences between the latched data, e.g., a bit location that is a 1 in one of the copies but a 0 in the two other copies. Identifying the correct version of the neural network data based on a majority rules policy may be performed, e.g., on a bit by bit basis by choosing the bit value that is the same in two of the copies (e.g., 0) and rejecting the bit that is different (e.g., 1). That is, for a system that stores three copies, the majority rules policy may be that the two matching bit values prevail over the single different bit. More generally, for a system storing an odd number of copies (e.g., five copies), the majority bit value wins out. For a system that stores four copies, the majority rules policy may be that three matching bits prevail over the single different bit, and further that a tie (two 1 bits vs. two 0 bits) is deemed undecided and so more sophisticated ECC decoding may be applied. More generally, for a system that stores an even number of copies greater than two (e.g., four or six copies), the majority rules policy may be that a majority of matching bits prevail over a minority, and further that any tie (e.g., three 1 bits vs. three 0 bits) is deemed undecided and so more sophisticated ECC decoding may be applied. As a practical matter, storing three copies is often sufficient, but if the BER is high, then storing more copies may be warranted. Depending upon the needs of the DSD, once the majority rules policy is applied to resolve a discrepancy, the correct data may be re-written to the NVM (and again stored as three copies) or the correct data may be processed by the NTM or sent to the host, or other appropriate actions may be taken. If the data is re-written, it may be written to a set of new storage locations (with the original storage locations marked for garbage collection) or the original memory location having the incorrect data may be erased and the corrected data written to that memory location without disturbing the other, correct copies. As noted above, the memory locations for the various copies might be on separate dies.

Disparity Count-Based Error Detection for Use with Neural Network Data Stored in NVM In the case of a data retention issue, the NTM controller of a hybrid DSD (e.g., the controller 109 of DSD 104 of FIG. 1) can signal to the host that there is a problem based off counts of zeros and ones. When the data passes through the NTM controller, the NTM controller may keep track of a running delta (Δ) between zeros and ones. (This assumes that the data is substantially equal parts zeros and ones, as expected if the data is scrambled by encryption or by other means, such as channel scramblers). The counting of the zeros/ones is done prior to any descrambling of the data. In one example, to calculate or count the disparity, an increment can be applied for a 1 and a decrement can be applied for a 0. This can be done on a stream of data processed by the NTM controller. If the disparity exceeds a predetermined or adaptively adjustable threshold, the disparity can be flagged to the host by the NTM controller or the NTM controller can refresh the data or take other actions. The threshold may depend on the fault tolerance of the particular NTM procedure being performing and on the correction capability of any ECC system being used (such as ECC 232 of FIG. 2). Changes or variations in disparity can be made even more robustly detectable by storing the disparity count for comparison over time. For example, the most recent disparity count may be compared to a disparity count from earlier (e.g., the previous day or week) so that trends in the disparity count can be detected, which may be indicative of degradation in data retention in the particular die or a particular portion of a die that the NTM data is stored in, thus triggering wear leveling, read threshold calibration, or other maintenance procedures.

Note that scrambled data may still have some differential (Δ) between the zeros and ones, which can be compensated for to increase the accuracy of the count at the time of read by removing the original disparity in the data. For example, any initial or original differential (Δ) or intrinsic bias in the zeroes vs ones count can be recorded by the NTM controller and then applied to a newly-determined count to compensate for the initial bias. Disparity information can also be useful when using SLC, which has performance and reliability advantages over MLC. In the case of SLC, all of the bits tend to move in the same direction for a particular storage degradation issue (such as a drift in read voltage thresholds over time causing zeroes to be mistakenly read as ones, or vice versa), and so a growing disparity in the count can be used to detect a particular degradation mechanism so that the appropriate actions can be taken (e.g., read threshold calibration) to address the particular degradation mechanism. In higher bit-per-cell uses (e.g., MLC), the NVM NAND pages are formed from multiple senses with logic operations for combining the senses to read data, and so any bit drift may not be as coherent as with SLC. Nevertheless, some MLC senses have greater susceptibility to errors than others and therefor can stand out as a detectable disparity. Generally speaking, there may be more noise associated with such disparities and so different thresholds may be used as compared to SLC.

Figure 10:
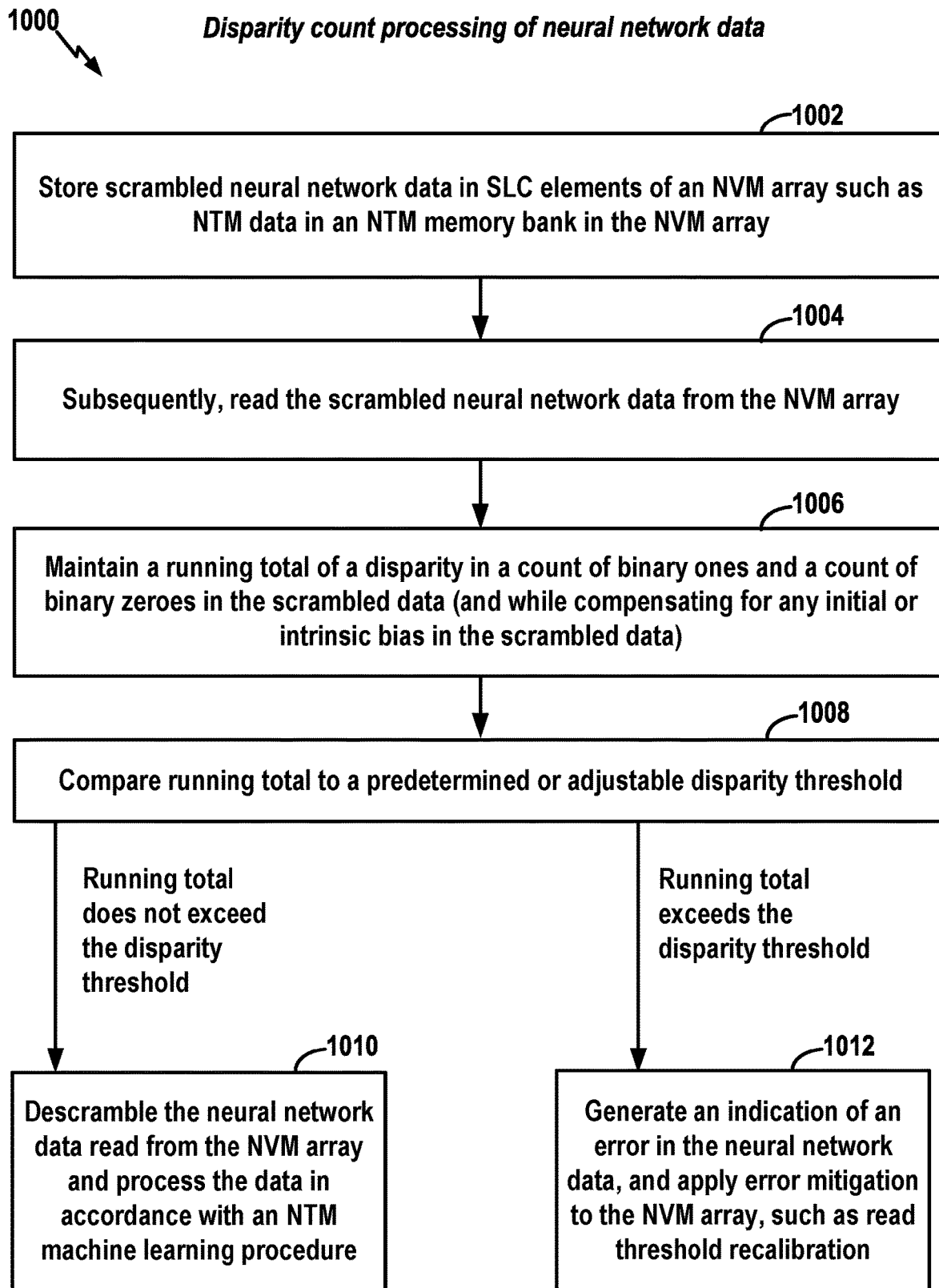
FIG. 10 illustrates an exemplary method for use by a DSD to control a disparity count-based error correction procedure.

FIG. 10 illustrates method 1000 that may be performed or controlled by a DSD having an NTM controller (such as by the data scrambler controller 234 of the NTM controller 208 of FIG. 2) or other suitably equipped devices for controlling/performing a disparity count-based procedure for detecting errors in neural network data stored in an NVM such as with the NTM memory bank 117 of FIG. 1. Alternatively, the procedure may be performed by other components or circuitry within the DSD.

Beginning at block 1002, the NTM controller stores scrambled neural network data in an NVM array, such as scrambled NTM data in an NTM memory bank in the NVM array. As noted above, in some examples, the data is preferably stored in SLC elements. The data may be scrambled by a data scrambler or by an ECC component (which, as a consequence of its error coding, tends to scramble or randomize data). Subsequently, at block 1004, as part of a machine learning procedure or other data processing procedure, the NTM controller reads the scrambled neural network data from the NVM array. This may be part of one iteration of an iterative procedure, as the iterative procedure of FIG. 7.

At block 1006, the NTM controller maintains a running total of a disparity in a count (or number) of binary ones and a count (or number) of binary zeroes in the scrambled data.

In one example, each block or word-line of scrambled data is read into a latch and latch circuitry outputs a value representative of the disparity count. In one particular example, if there are 512 bits in a given portion of data, and 250 bits are binary zeroes and 262 bits are binary ones, then the disparity of ones over zeroes is 12, indicating a bias in favor of ones within that particular portion of data. As each new portion of data is read in, the running total is updated to reflect the latest disparity bit count. Note that, within block 1006, the NTM controller may compensate for any initial or intrinsic bias in the scrambled data. As explained above, scrambled data may still have some differential between the zeros and ones. For example, if the ECC is used to "scramble" the data, then the particular ECC procedure may result in a bias between ones and zeroes. Hence, the initial bias may be detected or determined by the NTM controller and applied to each new disparity count to compensate for the original disparity in the data.

At block 1008, the NTM controller compares the running total to a predetermined (or adjustable) threshold. As noted above, the threshold may depend on the fault tolerance of the particular NTM procedure and on the correction capability of any ECC system being used. Otherwise routine experimentation may be performed by engineers on test DSDs with NTM controllers and ECC systems to identify suitable thresholds that may be programmed into DSDs to be deployed to customers. In some embodiments, the thresholds may be changed by the DSD based on various factors, such as whether the ECC is currently set to perform strong ECC or a relatively weaker ECC. At block 1010, in response to a determination that the running total does not exceed the disparity threshold (i.e. the data appears to be valid), the NTM controller descrambles the neural network data read from the NVM array and processes the data in accordance with an NTM machine learning procedure.

At block 1010, in response to a determination that the running total exceeds the disparity threshold (i.e., the data appears to be invalid due to storage read or write errors), the NTM controller generates an indication of an error in the neural network data. In response to the error indication, the DSD may notify the host and apply error mitigation to the NVM array, such as read threshold recalibration, wear leveling, or the like. The data is also discarded and erased from the NVM and then, when possible, the correct data is obtained from the host, re-generated by the NTM controller, or recovered from volatile memory in the DSD, if available in volatile memory. In some cases, the NTM controller may need to re-set to a previous state to re-generate the data.

Figure 11:
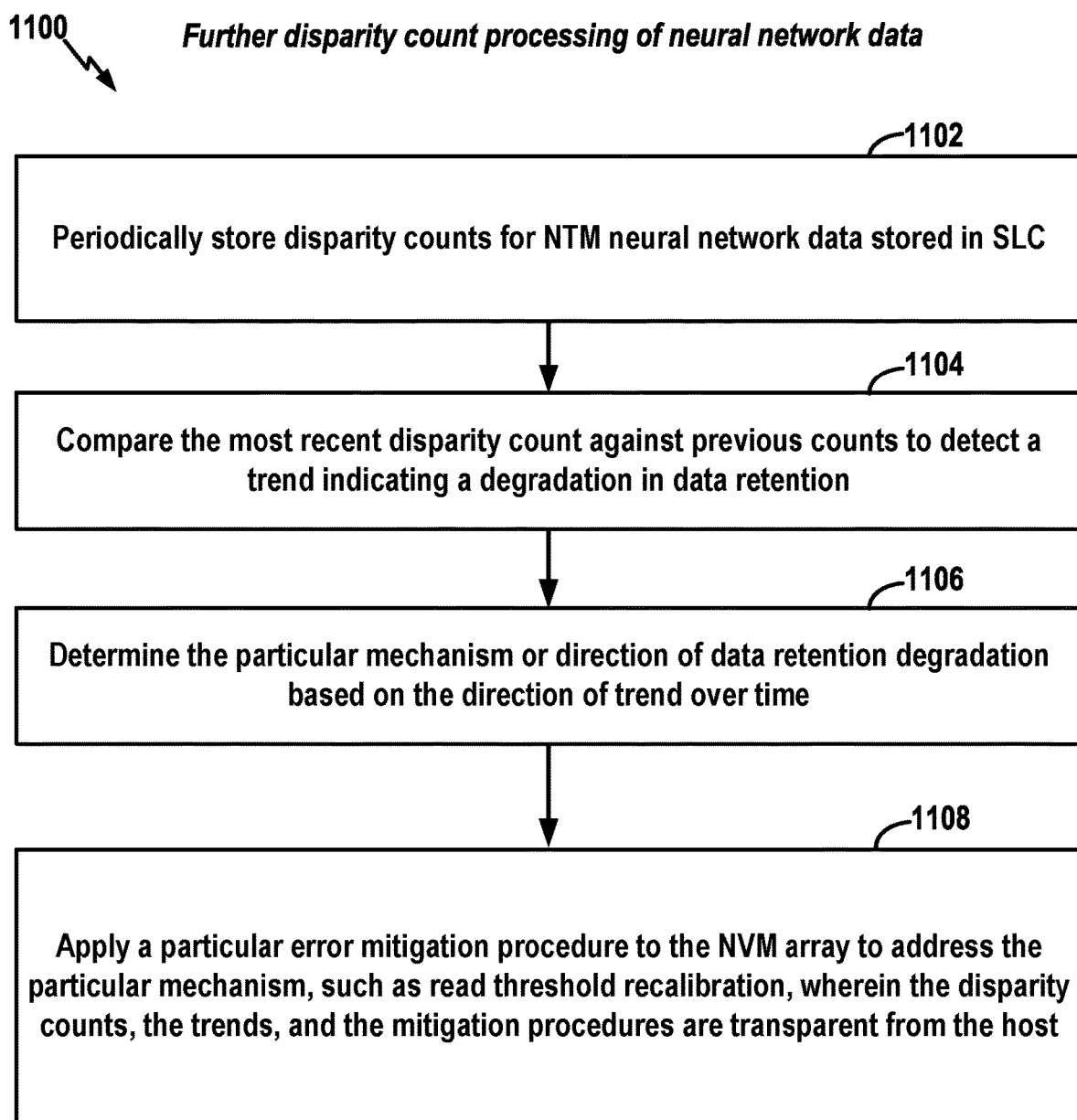
FIG. 11 illustrates first aspects of an exemplary method for use by a DSD to control a disparity count-based error correction procedure.

FIG. 11 illustrates method 1100 that may be performed or controlled by a DSD having an NTM controller (such as by the data scrambler controller 234 of the NTM controller 208 of FIG. 2) or other suitably equipped devices for controlling/performing a disparity count-based procedure for detecting trends in disparity counts over time within neural network data stored in an NVM such as with the NTM memory bank 117 of FIG. 1. Alternatively, the procedure may be performed by other components or circuitry within the DSD. Beginning at block 1102, the NTM controller periodically stores disparity counts for NTM neural network data stored in SLC elements within the NVM array, such as SLC elements of an NTM memory bank. For example, after each iteration of an NTM procedure, the disparity count for data read from the NVM for that procedure may be stored. This information may be collected and stored for the entire NTM memory bank or for portions thereof.

At block 1104, the NTM controller compares the most recent disparity count against previous counts to detect a trend (if any) in the disparity counts indicating a degradation in data retention within the NTM memory bank or portions thereof, such as within the SLC storage elements of the NTM memory bank. For example, if the SLC disparity counts are significantly greater in one week as compared to the previous week, such may indicate degradation of the NTM memory bank SLC elements. Moreover, the NTM controller examines at the direction of the trend, e.g., a trend toward more binary zeroes or a trend toward more binary ones. At block 1106, the NTM controller attempts to determine the particular mechanism or direction of data retention degradation based on the direction of the trend over time for the NTM memory bank as a whole or for portions thereof. For example, in a particular DSD design, a drift toward more binary ones over binary zeroes throughout all of the SLC elements of the NTM memory bank may be indicative of a drift toward increasing read thresholds, whereas a drift toward more binary zeroes over binary ones may be indicative of decreasing read thresholds. The information may be useful in making a read threshold calibration procedure more efficient. As another example, a drift toward more binary ones over binary zeroes within a first portion of the NTM memory bank as compared to a second portion may be indicative of an indicative of wear in the first portion. The information may be useful in making a wear leveling procedure more efficient. Otherwise routine experimentation may be performed by engineers on DSDs being designed with NTM controllers to identify which trends in disparity counts correspond to which data retention degradation mechanisms, such as read voltage drift or general wear. At block 1108, the NTM controller applies a particular error mitigation procedure to the NVM array to address the particular mechanism, such as by applying read threshold recalibration or wear leveling. Note that the disparity counts, the trends, and the mitigation procedures may be transparent from the host, i.e., the host need not be notified and need not respond to such information.

Indeed any of the above-described procedures may be completely transparent to the host, so that the host is not made aware of ECC, disparity, redundancy, rewriting, etc. Hence, to the host, the DSD can still look effectively like an open channel (e.g., no intervening FTL) so that the host thinks that it is implementing any algorithm that host programmers wish to implement, and yet the procedures described herein can improve the reliability in the background. NVM express (NVMe) may be employed.

Also note that the methods described herein can be used in an intelligent or managed NAND, such as with microcontroller units (MCUs), advanced logic, CMOS bonded array (CBA), etc. The methods create transparency to an SSD FW/application specific integrated circuit (ASIC), which can be helpful in memory locations where FW management might otherwise be problematic, such as locations used in booting (e.g., filesystems, FW copies, etc.), where FW media management algorithms may have only minimal functionality.

Additional Exemplary Methods and Apparatus

Figure 12:
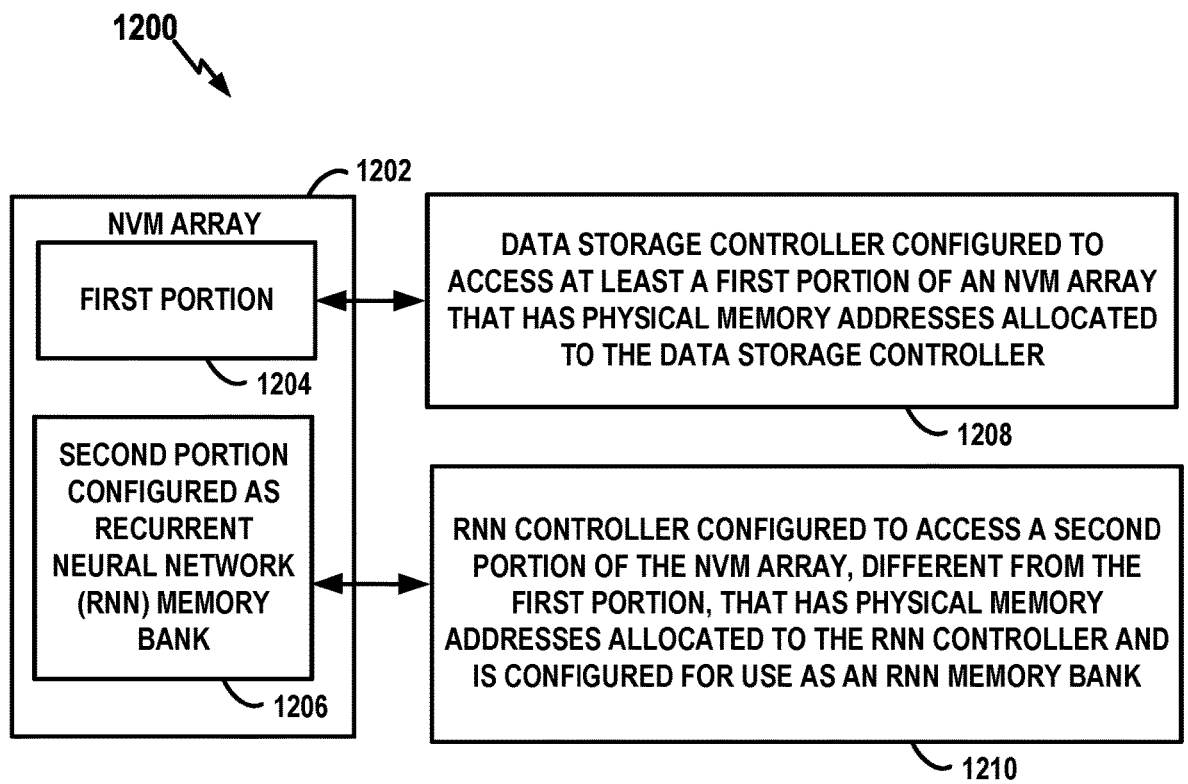
FIG. 12 is a schematic block diagram configuration for an exemplary DSD having an NTM controller and a separate data storage controller.

FIG. 12 illustrates an embodiment of an apparatus 1200 configured according to one or more aspects of the disclosure. The apparatus 1200, or components thereof, could embody or be implemented within any suitable apparatus or device capable of performing the operations, such as a DSD having a data storage controller and a separate RNN controller. The apparatus 1200 includes an NVM array 1202 having a first portion 1204 and a second portion 1206 that is configured for use as an RNN memory bank, such as an NTM memory bank. The apparatus 1200 also includes a data storage controller 1208 that is coupled to the NVM array 1202 and is configured to access at least the first portion 1204 of the NVM array that has physical memory addresses allocated to the data storage controller 1208. The apparatus 1200 also includes an RNN controller 1210 (such as an NTM controller) that is coupled to the NVM array 1202 and is configured to access the second portion 1206 of the NVM array that has physical memory addresses allocated to the RNN controller 1210. Note that, in some embodiments, the data storage controller 1208 is also configured to access the second portion 1206 of the NVM array. That is, the physical memory addresses of the second portion 1206 of the NVM array are not exclusively allocated to the RNN controller 1210, thus allowing the data storage controller 1208 to, e.g., perform wear leveling or other maintenance operations on the entire NVM array 1202. The access also allows the data storage controller 1208 to, e.g., apply FW-based FTL procedures to data in the RNN memory bank 1206 during a second phase of a two-phase NTM procedure, as described above.

Figure 13:
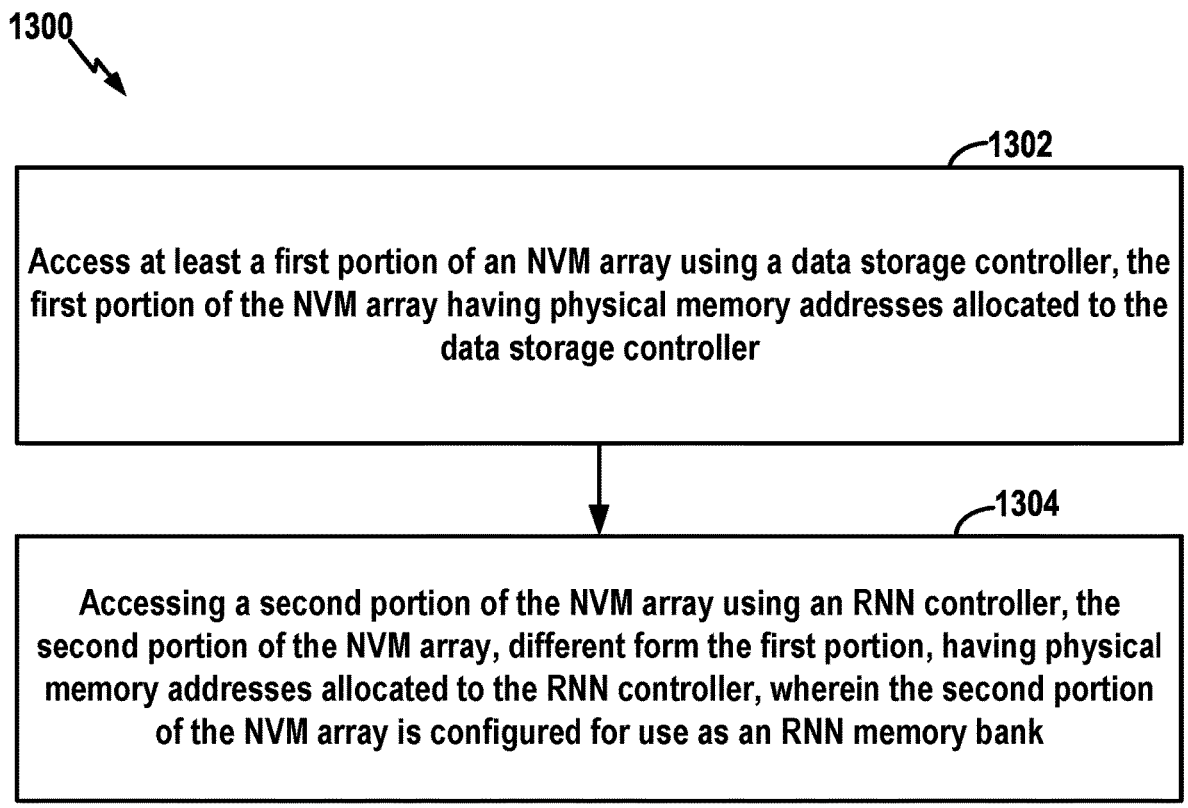
FIG. 13 illustrates an exemplary method for use by a DSD having an NTM controller and a separate data storage controller.

FIG. 13 broadly illustrates another process 1300 in accordance with some aspects of the disclosure. The process 1300 may take place within any suitable apparatus or device capable of performing the operations that is coupled to an NVM array, such as the apparatus of FIG. 12. At block 1302, the device accesses at least a first portion of the NVM array using the data storage controller, the first portion of the NVM array having physical memory addresses allocated to the data storage controller. At block 1304, the device accesses a second portion of the NVM array using the RNN controller, the second portion of the NVM array having physical memory addresses allocated to the RNN controller, wherein the second portion of the NVM array is configured for use as an RNN memory bank. As discussed above, in some embodiments, the data storage controller is also configured to access the second portion of the NVM array, i.e., the physical memory addresses of the second portion of the NVM array are not exclusively allocated to the RNN controller, thus allowing the data storage controller to, e.g., perform wear leveling or other maintenance operations on the entire NVM array or to apply FW-based FTL procedures to data in the RNN memory bank during a second phase of a two-phase NTM procedure.

Figure 14:
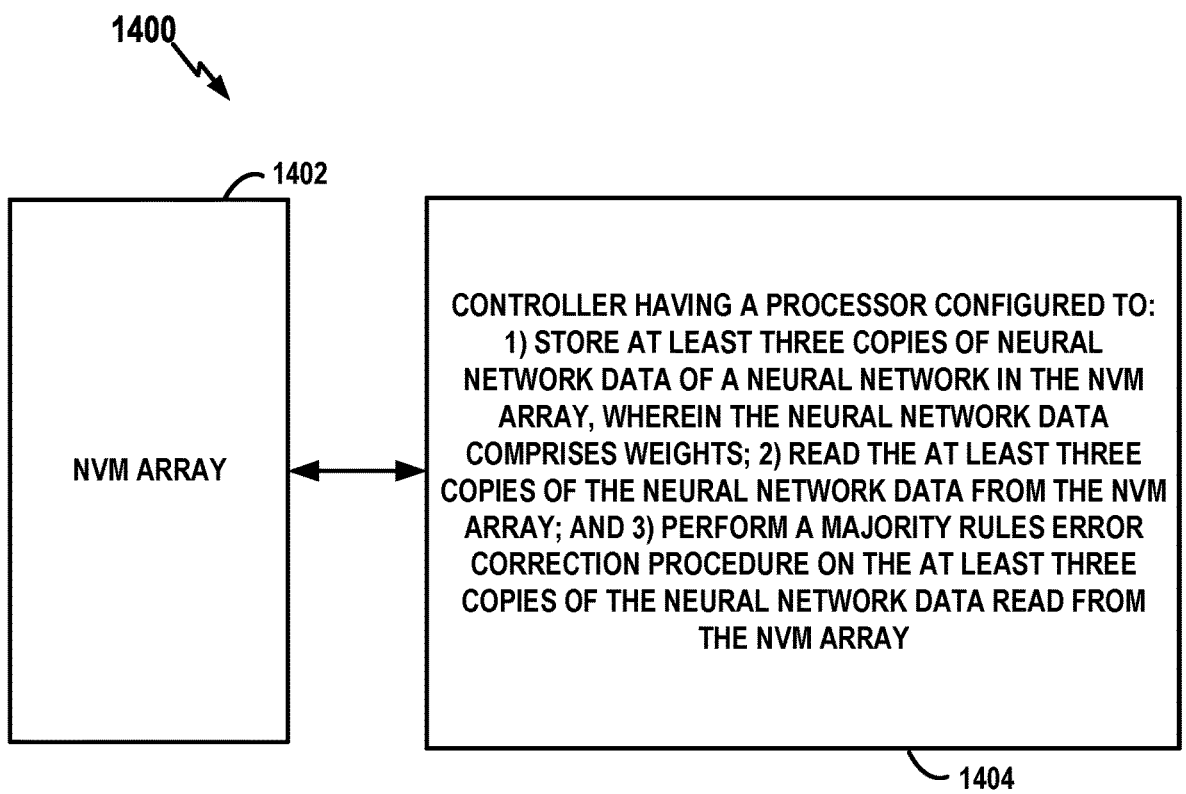
FIG. 14 is a schematic block diagram configuration for an exemplary DSD configured to perform a majority wins error correction procedure.

FIG. 14 illustrates an embodiment of an apparatus 1400 configured according to one or more aspects of the disclosure. The apparatus 1400, or components thereof, could embody or be implemented within any suitable apparatus or device capable of performing the operations, such as a DSD. The apparatus 1400 includes an NVM array 1402 and a controller 1404, such as a data storage controller or a separate RNN controller, that is coupled to the NVM array 1402 and has a processor that is configured to 1) store at least three copies of neural network data of a neural network in the NVM array, wherein the neural network data comprises weights; 2) read the at least three copies of the neural network data from the NVM array, such as during an iteration of an NTM procedure; and 3) perform a majority rules error correction procedure on the at least three copies of the neural network data read from the NVM array. Detailed examples are described above.

Figure 15:
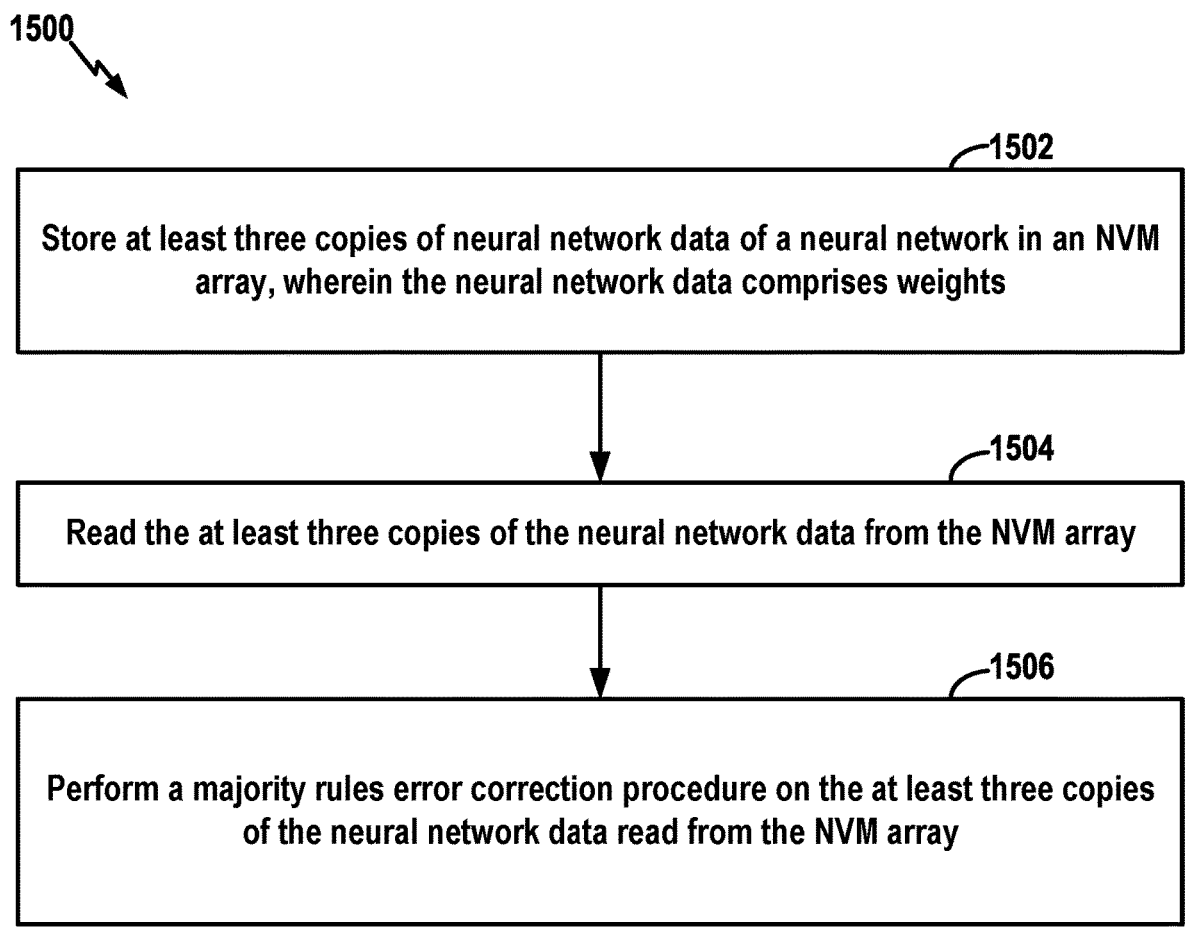
FIG. 15 illustrates an exemplary majority wins error correction procedure.

FIG. 15 broadly illustrates a process 1500 in accordance with some aspects of the disclosure. The process 1500 may take place within any suitable apparatus or device capable of performing the operations that is coupled to an NVM array, such as the apparatus of FIG. 14. At block 1502, the device stores at least three copies of neural network data, such as NTM weight data, of a neural network in the NVM array. At block 1504, the device reads the at least three copies of the neural network data from the NVM array. This may occur during a subsequent iteration of an NTM procedure. At block 1506, the device performs a majority rules error correction procedure on the at least three copies of the neural network data read from the NVM array. Detailed examples are described above.

Figure 16:
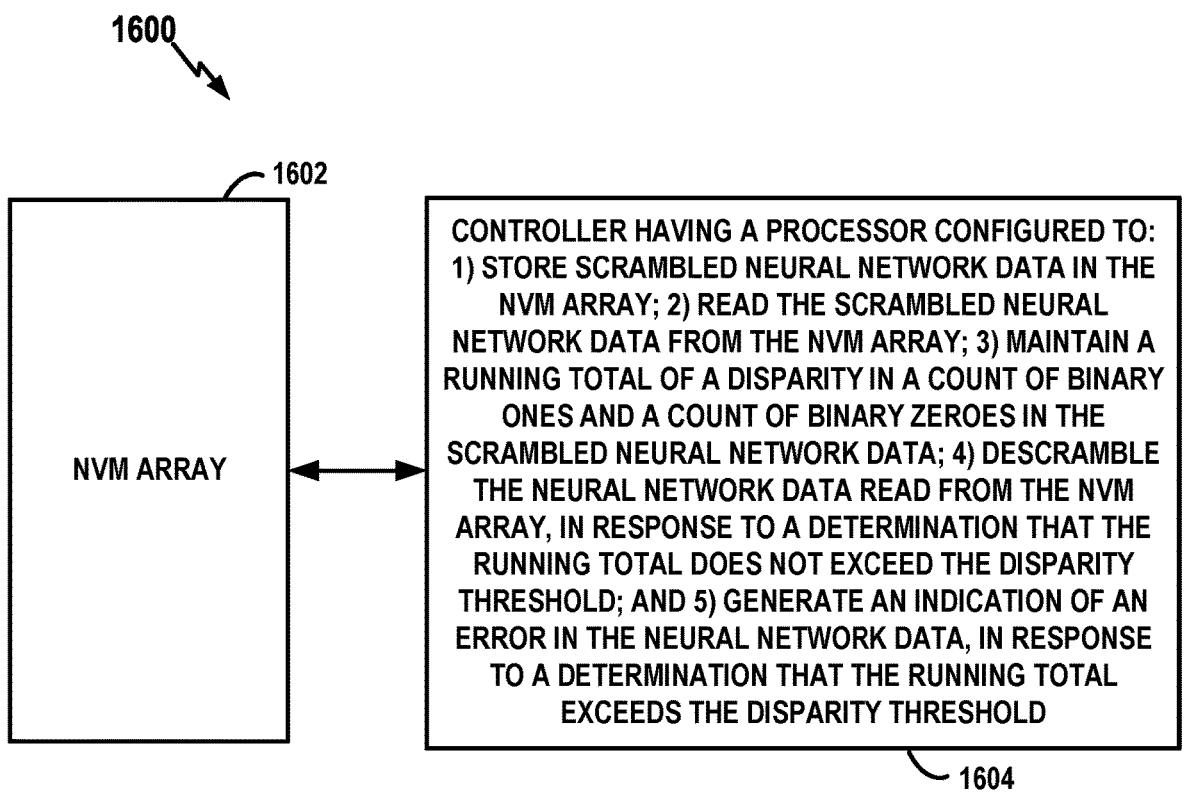
FIG. 16 is a schematic block diagram configuration for an exemplary DSD configured to perform a disparity count-based error correction procedure.

FIG. 16 illustrates an embodiment of an apparatus 1600 configured according to one or more aspects of the disclosure. The apparatus 1600, or components thereof, could embody or be implemented within any suitable apparatus or device capable of performing the operations, such as a DSD. The apparatus 1600 includes an NVM array 1602 and a controller 1604, such as a data storage controller or a separate RNN controller, that is coupled to the NVM array 1602 and has a processor that is configured to: 1) store scrambled neural network data in the NVM array 1602; 2) read the scrambled neural network data from the NVM array 1602; 3) maintain a running total of a disparity in a count (or number) of binary ones and a count (or number) of binary zeroes in the scrambled neural network data; 4) descramble the neural network data read from the NVM array 1602, in response to a determination that the running total does not exceed the disparity threshold; and 5) generate an indication of an error in the neural network data, in response to a determination that the running total exceeds the disparity threshold. Detailed examples are described above.

Figure 17:
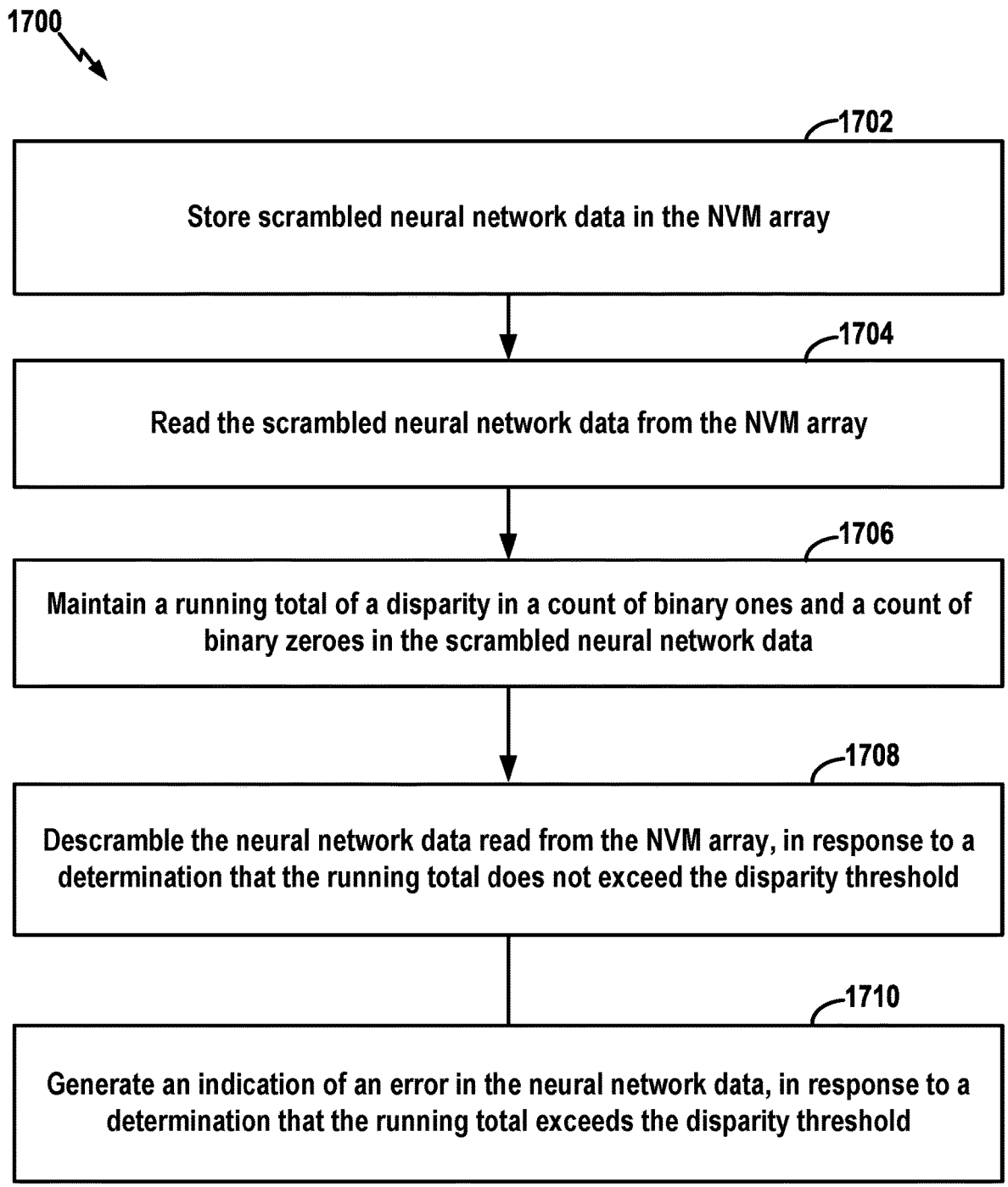
FIG. 17 illustrates an exemplary disparity count-based error correction procedure.

FIG. 17 broadly illustrates a process 1700 in accordance with some aspects of the disclosure. The process 1700 may take place within any suitable apparatus or device capable of performing the operations that is coupled to an NVM array, such as the apparatus of FIG. 14. At block 1702, the device stores scrambled neural network data in the NVM array, such as scrambled NTM data. At block 1704, the device reads the scrambled neural network data from the NVM array, as may be performed during a next iteration of an NTM procedure. At block 1706, the device maintains a running total of a disparity in a count (or number) of binary ones and a count (or number) of binary zeroes in the scrambled neural network data. At block 1708, in response to a determination that the running total does not exceed the disparity threshold, the device descrambles the neural network data read from the NVM array. At block 1710, in response to a determination that the running total exceeds the disparity threshold, the device instead generates an indication of an error in the neural network data. The error may be, for example, sent to a host that is connected to the device, or may be sent to other components of the device for remedial actions. As already explained, the device may respond to the error indication by re-storing or refreshing the data and/or by taking action to address read threshold voltage drift, NVM wear, etc. Detailed examples are described above.

Exemplary Apparatus having with NVM Array

Figure 18:
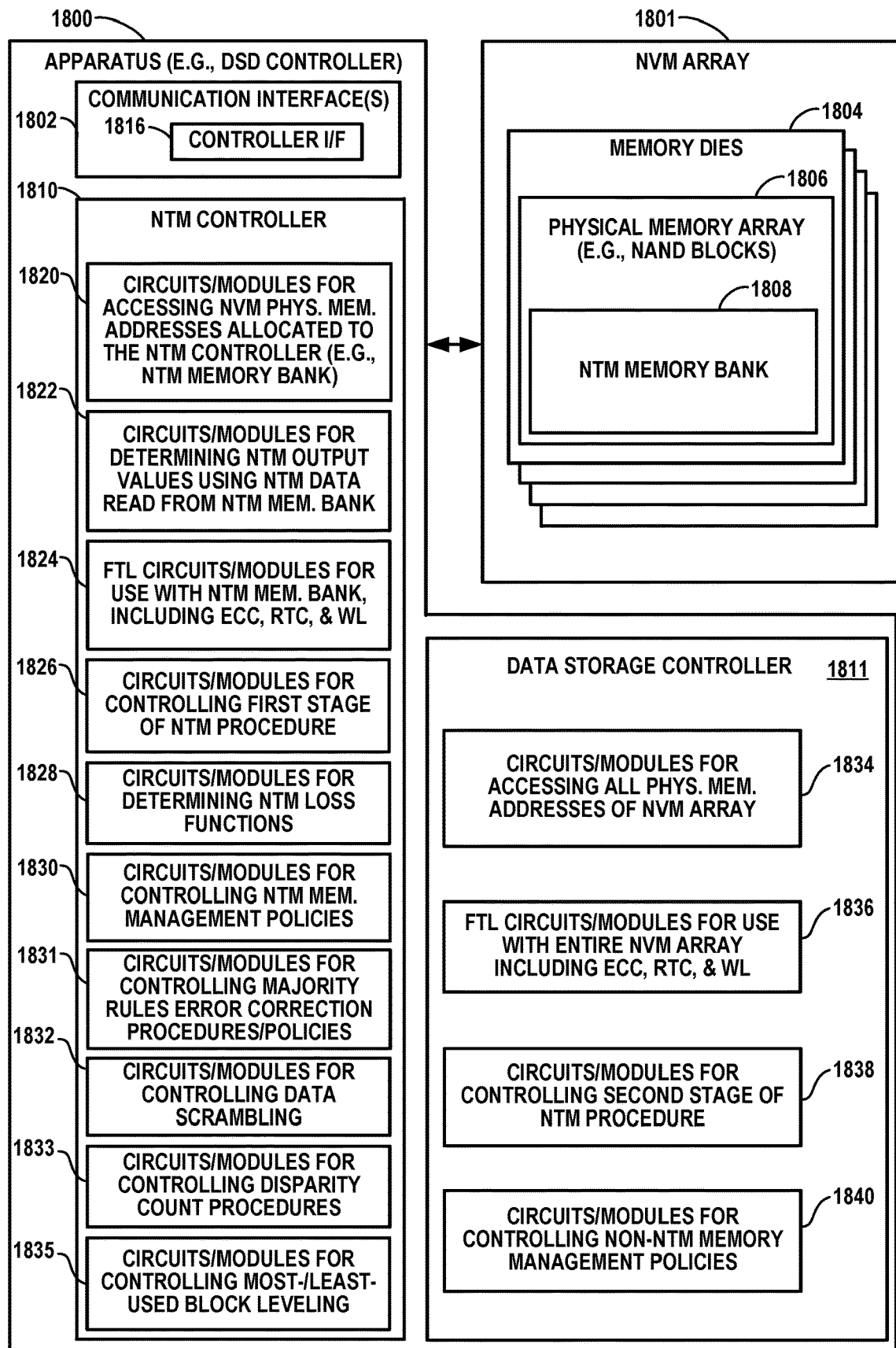
FIG. 18 is a schematic block diagram configuration for an exemplary apparatus such as a DSD having an NTM controller that is separate from an SSD controller.

FIG. 18 illustrates an embodiment of an apparatus 1800 configured according to one or more aspects of the disclosure. The apparatus 1800, or components thereof, could embody or be implemented within a DSD other type of device that supports data storage. In various implementations, the apparatus 1800, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes, or uses data.

The apparatus 1800 is communicatively coupled to an NVM array 1801 that includes one or more memory dies 1804, each of which may include physical memory arrays 1806, e.g. NAND blocks, with at least one of the memory dies including an NTM memory bank 1808 (or other RNN or MANN memory bank). The physical memory array 1806 may be communicatively coupled to the apparatus 1800 such that the apparatus 1800 can read or sense information from, and write or program information to, the physical memory array 1806. That is, the physical memory array 1806 can be coupled to circuits of apparatus 1800 so that the physical memory array 1806 are accessible by the circuits of apparatus 1800. Note that not all components of the memory dies are shown. The dies may include, e.g., extra-array processing circuits (e.g. under-the-array or next-to-the-array circuits), as well as input/output components, etc. The connection between the apparatus 1800 and the memory dies 1804 of the NVM array 1801 may include, for example, one or more busses.

The apparatus 1800 includes a communication interface 1802, an NTM controller 1810, and a data storage controller 1811. The NTM controller 1810 and the data storage controller 1811 may be on separate chips (e.g., separate ASIC) within the apparatus 1800. In other embodiments, the NTM controller 1810 and the data storage controller 1811 may be on the same chip. These components can be coupled to and/or placed in electrical communication with one another and with the NVM array 1801 via suitable components, represented generally by connection lines in FIG. 18. Although not shown, other circuits such as timing sources, peripherals, voltage regulators, and power management circuits may be provided, which are well known in the art, and therefore, will not be described any further.

The communication interface 1802 provides a means for communicating with other apparatuses over a transmission medium. In some implementations, the communication interface 1802 includes circuitry and/or programming (e.g., a program) adapted to facilitate the communication of information bi-directionally with respect to one or more devices in a system. In some implementations, the communication interface 1802 may be configured for wire-based communication. For example, the communication interface 1802 could be a bus interface, a send/receive interface, or some other type of signal interface including circuitry for outputting and/or obtaining signals (e.g., outputting signal from and/or receiving signals into an SSD). The communication interface 1802 serves as one example of a means for receiving and/or a means for transmitting.

The NTM controller 1810 and the data storage controller 1811 include modules and/or circuits are arranged or configured to obtain, process and/or send data, control data access and storage, issue or respond to commands, and control other desired operations. For example, the various modules/circuits may be implemented as one or more processors, one or more controllers, and/or other structures configured to perform functions. According to one or more aspects of the disclosure, the modules/circuits may be adapted to perform the various features, processes, functions, operations and/or routines described herein. For example, the various modules/circuits may be configured to perform the steps, functions, and/or processes described with respect to FIGS. 1-17.

Note that, in some embodiments, the features of the NTM controller 1810 are implemented as non-deterministic software modules, whereas the features of the data storage controller 1811 are implemented as deterministic FW or HW circuits. The various features are referred to in FIG. 18 as circuits/modules since, in at least some embodiments, at least some of the features of the NTM controller 1810 may be implemented as circuits and at least some of the features of the data storage controller 1811 may be implemented in software. Also, in some embodiments, some features of the NTM controller 1810 may be implemented on the memory die 1804 as under-the-array or next-to-the array circuitry.

As used herein, the term "adapted" in relation to the processing modules/circuits may refer to the modules/circuits being one or more of configured, employed, implemented, and/or programmed to perform a particular process, function, operation and/or routine according to various features described herein. The modules/circuits may include a specialized processor, such as an application specific integrated circuit (ASIC) that serves as a means for (e.g., structure for) carrying out any one of the operations described in conjunction with FIGS. 1-17. The modules/circuits serve as an example of a means for processing. In various implementations, the modules/circuits may provide and/or incorporate, at least in part, functionality described above for the components in various embodiments shown.

According to at least one example of the apparatus 1800, the NTM controller 1810 may include circuit/modules 1820 configured for accessing NVM physical memory addresses allocated to the NTM controller (e.g., the addresses associated with the NTM memory bank 1808). The allocation of the physical memory addresses to the NTM controller 1810 may be performed on boot-up by boot circuitry (not shown) or performed or controlled, for example, by a host coupled to the apparatus 1800. The NTM controller 1810 may also include one or more of: circuits/modules 1822 configured for determining NTM output values using NTM data read from the NTM memory bank 1808 (e.g., for performing various iterations of an NTM machine learning procedure to generate trained neural network parameters, such as trained synaptic weights or the like for output to a host); FTL circuits/modules 1824 configured for use with the NTM memory bank 1808, such as ECC circuits/modules, read threshold calibration circuits/modules, and wear leveling circuits/modules, etc. (which may differ from corresponding FTL components of the data storage controller 1811 that may apply FW FTL to the entire NVM array 1801 and which, in some embodiments, may be omitted entirely from the NTM controller 1810); circuits/modules 1826 configured for controlling a first stage of an NTM procedure (e.g., as in FIG. 7); circuits/modules 1828 configured for determining an NTM loss function (e.g., as in FIG. 7); circuits/modules 1830 configured for controlling NTM memory management policies (which may differ from memory management policies applied by the data storage controller 1811); circuits/modules 1831 configured for controlling majority rules error correction procedures or polices; circuits/modules 1832 configured for controlling data scrambling; circuits/modules 1833 configured for controlling disparity count procedures; and circuits/modules 1835 configured for controlling most-used block/least-used block wear leveling procedures.

According to at least one example of the apparatus 1800, the data storage controller 1811 may include circuit/modules 1834 configured for accessing all physical memory addresses within the NVM array 1801 or some portion of those addresses (or, in some embodiments, all addresses not allocated to the NTM memory bank 1808). The allocation of the physical memory addresses to the data storage controller 1811 may be performed on boot-up by boot circuitry (not shown) or performed or controlled, for example, by a host coupled to the apparatus 1800. The data storage controller 1811 may also include one or more of: FTL circuits/modules 1836 configured for use with the NVM array 1801, such as ECC circuits/modules, read threshold calibration circuits/modules, and wear leveling circuits/modules, etc. (which may differ from corresponding FTL components of the NTM controller 1810, which apply FW FTL, if at all, only to NTM memory bank 1808); circuits/modules 1838 configured for controlling a second stage of an NTM procedure (e.g., as in FIG. 7); and circuits/modules 1840 configured for controlling non-NTM memory management policies (which may differ from the memory management policies applied by the NTM controller 1810 to the NTM memory bank 1808).

In at least some examples, means may be provided for performing the functions illustrated in FIG. 18 and/or other functions illustrated or described herein. For example, the means may include one or more of: means, such as circuit/modules 1820, for accessing NVM physical memory addresses allocated to the NTM controller (e.g., the addresses associated with the NTM memory bank 1808); means, such as circuits/modules 1822, for determining NTM output values using NTM data read from the NTM memory bank 1808 (e.g., for performing various iterations of an NTM machine learning procedure to generate trained neural network parameters, such as trained synaptic weights or the like for output to a host); means, such as circuits/modules 1824, configured for applying FTL operations to the NTM memory bank 1808, such as ECC, read threshold calibration, and wear leveling, etc. (which may differ from corresponding FTL operations of the data storage controller 1811); means, such as circuits/modules 1826, for controlling a first stage of an NTM procedure (e.g., as in FIG. 7); means, such as circuits/modules 1828, for determining an NTM loss function (e.g., as in FIG. 7); means, such as circuits/modules 1830, for controlling NTM memory management policies (which may differ from memory management policies applied by the data storage controller 1811); means, such as circuits/modules 1831, for controlling majority rules error correction procedures or polices; means, such as circuits/modules 1832, for controlling data scrambling; means, such as circuits/modules 1833, for controlling disparity count procedures; means, such as circuits/modules 1835, for controlling most-used block/least-used block wear leveling procedures; means, such as circuit/modules 1834, for accessing all physical memory addresses within the NVM array 1801 or some portion of those addresses (or, in some embodiments, all addresses not allocated to the NTM memory bank 1808); means, such as circuits/modules 1836, for applying FTL operations to the NVM array 1801, such as ECC, read threshold calibration, and wear leveling, etc. (which may differ from corresponding FTL operations of the NTM controller 1810); means, such as circuits/modules 1838, for controlling a second stage of an NTM procedure (e.g., as in FIG. 7); and means, such as circuits/modules 1840, configured for controlling non-NTM memory management policies (which may differ from the memory management policies applied by the NTM controller 1810 to the NTM memory bank 1808).

In yet another aspect of the disclosure, a non-transitory computer-readable medium is provided that has one or more instructions which when executed by a processing circuit or software module in a DSD controller that causes the controller to perform one or more of the functions or operations listed above.

In at least some examples, software code may be provided for performing the functions illustrated in FIG. 18 and/or other functions illustrated or described herein. For example, the code may include one or more of: code for accessing NVM physical memory addresses allocated to the NTM controller (e.g., the addresses associated with the NTM memory bank 1808); code for determining NTM output values using NTM data read from the NTM memory bank 1808 (e.g., for performing various iterations of an NTM machine learning procedure to generate trained neural network parameters, such as trained synaptic weights or the like for output to a host); code for applying FTL operations to the NTM memory bank 1808, such as ECC, read threshold calibration, and wear leveling, etc. (which may differ from corresponding FTL operations of the data storage controller 1811); code for controlling a first stage of an NTM procedure (e.g., as in FIG. 7); code for determining an NTM loss function (e.g., as in FIG. 7); code for controlling NTM memory management policies (which may differ from memory management policies applied by the data storage controller 1811); code for controlling majority rules error correction procedures or polices; code for controlling data scrambling; code for controlling disparity count procedures; code for controlling most-used block/least-used block wear leveling procedures; code for accessing all physical memory addresses within the NVM array 1801 or some portion of those addresses (or, in some embodiments, all addresses not allocated to the NTM memory bank 1808); code for applying FTL operations to the NVM array 1801, such as ECC, read threshold calibration, and wear leveling, etc. (which may differ from corresponding FTL operations of the NTM controller 1810); code for controlling a second stage of an NTM procedure (e.g., as in FIG. 7); and code for controlling non-NTM memory management policies (which may differ from the memory management policies applied by the NTM controller 1810 to the NTM memory bank 1808).

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NAND flash memory, such as 3D NAND flash memory. Semiconductor memory devices include volatile memory devices, such as DRAM or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
    a non-volatile memory (NVM) array; and
    a controller coupled to the NVM array and having a processor configured to:
        receive data for storage in the NVM array;
        determine whether the data is neural network data or non-neural network data;
        in response to a determination the data is neural network data,
            store at least three copies of the neural network data in the NVM array;
            read the at least three copies of the neural network data from the NVM array; and
            perform a majority rules error correction procedure on the at least three copies of the neural network data read from the NVM array; and
        in response to a determination the data is non-neural network data,
            store the non-neural network data in the NVM array;
            read the non-neural network data from the NVM array; and
            perform an error correction code (ECC) procedure on the non-neural network data, the ECC procedure being different from the majority rules error correction procedure.

2. The data storage device of claim 1, wherein the neural network data corresponds to a neural network that is configured so that an uncorrected error in the neural network data increases regularization of the neural network.

3. The data storage device of claim 1, wherein the processor is further configured to:
    scramble the neural network data before storing at least three copies of the scrambled neural network data in the NVM array;
    perform the majority rules error correction procedure on the at least three scrambled copies of the neural network data read from the NVM array; and
    unscramble the scrambled neural network data.

4. The data storage device of claim 1, wherein the processor is further configured to perform the majority rules error correction procedure on the neural network data by being further configured to:
  detect a difference between the at least three copies of the neural network data read from the NVM array; and
  identify a correct version of the neural network data based on a majority rules policy.

5. The data storage device of claim 4, wherein the processor is further configured to re-write the correct version of the neural network data in a new memory location within the NVM array.

6. The data storage device of claim 4, wherein the processor is further configured to re-write the correct version of the neural network data by being further configured to erase the memory location of an incorrect copy of the data and writing the correct version of the data to the memory location that had been erased.

7. The data storage device of claim 1, wherein the at least three copies consist of an odd number of copies.

8. The data storage device of claim 1, wherein the processor is further configured to store the at least three copies with at least one of the copies stored on a different die within the NVM array from the other copies.

9. The data storage device of claim 1, wherein the processor is further configured to perform a wear leveling procedure on the NVM array by being further configured to:
  track a program rate of blocks of the NVM array that store the neural network data to identify a most-used block and a least-used block; and
  periodically swap neural network data stored in the most-used block with neural network data stored in the least-used block.

10. The data storage device of claim 1, wherein the neural network data corresponds to a recurrent neural network (RNN) comprising at least one of a Memory Augmented Neural Network (MANN) or a Neural Turing Machine (NTM) network.

11. The data storage device of claim 1, wherein the controller comprises a data storage controller and a separate recurrent neural network (RNN) controller.

12. The data storage device of claim 11,
  wherein the data storage controller is configured to access at least a first portion of the NVM array that has physical memory addresses allocated to the data storage controller; and
  wherein the RNN controller is configured to access a second portion of the NVM array, different from the first portion, that has physical memory addresses allocated to the RNN controller, wherein the second portion of the NVM array is configured for use as an RNN memory bank.

13. A method for use with a data storage device that includes a non-volatile memory (NVM) array, the method comprising:
  receiving data for storage in the NVM array;
  determining whether the data is neural network data or non-neural network data;
  in response to a determination the data is neural network data,
    storing at least three copies of the neural network data in the NVM array;
    reading the at least three copies of the neural network data from the NVM array; and
    performing a majority rules error correction procedure on the at least three copies of the neural network data read from the NVM array; and
  in response to a determination the data is non-neural network data,
    storing the non-neural network data in the NVM array;
    reading the non-neural network data from the NVM array; and
    performing an error correction code (ECC) procedure on the non-neural network data, the ECC procedure being different from the majority rules error correction procedure.

14. The method of claim 13, wherein a likelihood of a bit error coinciding on a same bit at two separate storage locations of the stored neural network data is below a threshold representative of an acceptable fault tolerance.

15. The method of claim 13, wherein the neural network data corresponds to a neural network that is configured so that an uncorrected error in the neural network data increases regularization of the neural network.

16. The method of claim 13, wherein the majority rules error correction procedure comprises:
  detecting a difference between the at least three copies of the neural network data read from the NVM array; and
  identifying a correct version of the neural network data based on a majority rules policy.

17. The method of claim 16, further comprising re-writing the correct version of the neural network data in a new memory location within the NVM array.

18. The method of claim 16, further comprising re-writing the correct version of the neural network data by erasing a memory location of an incorrect copy of the data and writing the correct version of the data to the memory location that had been erased.

19. The method of claim 13, further comprising:
  scrambling the neural network data before storing at least three copies of the scrambled neural network data in the NVM array;
  performing the majority rules error correction procedure on the at least three scrambled copies of the neural network data read from the NVM array; and
  unscrambling the scrambled neural network data.

20. The method of claim 13, wherein the at least three copies consist of an odd number of copies.

21. The method of claim 13, further comprising storing the at least three copies with at least one of the copies stored on a different die within the NVM array from the other copies.

22. The method of claim 13, further comprising performing a wear leveling procedure on the NVM array by:
  tracking a program rate of blocks of the NVM array that store the neural network data to identify a most-used block and a least-used block; and
  periodically swapping neural network data stored in the most-used block with neural network data stored in the least-used block.

23. An apparatus for use with a data storage device that includes a non-volatile memory (NVM) array, the apparatus comprising:
  means for receiving data for storage in the NVM array;
  means for determining whether the data is neural network data or non-neural network data;
  means, operative in response to a determination the data is neural network data, for storing at least three copies of the neural network data in the NVM array;
  means for reading the at least three copies of the neural network data from the NVM array;
  means for performing a majority rules error correction procedure on the at least three copies of the neural network data read from the NVM array;

means, operative in response to a determination the data is non-neural network data, for storing the non-neural network data in the NVM array;

means for reading the non-neural network data from the NVM array; and means for performing an error correction code (ECC) procedure on the non-neural network data, the ECC procedure being different from the majority rules error correction procedure.

24. A non-transitory computer-readable medium comprising one or more instructions which when executed by a controller of a data storage device having a non-volatile memory (NVM) array causes the controller to:

receive data for storage in the NVM array;

determine whether the data is neural network data or non-neural network data;

in response to a determination the data is neural network data, store at least three copies of the neural network data in the NVM array, read the at least three copies of the neural network data from the NVM array, and perform a majority rules error correction procedure on the at least three copies of the neural network data read from the NVM array; and in response to a determination the data is non-neural network data, store the non-neural network data in the NVM array, read the non-neural network data from the NVM array, and perform an error correction code (ECC) procedure on the non-neural network data, the ECC procedure being different from the majority rules error correction procedure.

* * * * *